United States Patent
Ozkan et al.

(10) Patent No.: US 6,709,643 B1
(45) Date of Patent: Mar. 23, 2004

(54) CATALYST AND METHOD OF USE IN THE REDUCTION OF NITROGEN OXIDES USING LOWER HYDROCARBONS

(75) Inventors: Umit S. Ozkan, Worthington, OH (US); Junko M. Watson, Columbus, OH (US)

(73) Assignee: The Ohio State University, Columbus, OH (US)

( * ) Notice: Subject to any disclaimer, the term of this patent is extended or adjusted under 35 U.S.C. 154(b) by 110 days.

(21) Appl. No.: 09/709,895

(22) Filed: Nov. 10, 2000

(51) Int. Cl.$^7$ .............................................. B01D 53/56
(52) U.S. Cl. .................... 423/239.1; 502/302; 502/303; 502/304; 502/309; 502/326
(58) Field of Search ................................. 502/302, 303, 502/304, 309, 326; 423/239.1

(56) References Cited

U.S. PATENT DOCUMENTS

| | | | | |
|---|---|---|---|---|
| 4,318,827 A | * | 3/1982 | Antos | 252/462 |
| 4,920,088 A | | 4/1990 | Kolts | 502/326 |
| 5,766,562 A | * | 6/1998 | Chattha et al. | 423/213.5 |

FOREIGN PATENT DOCUMENTS

WO  WO 99/16548  4/1999

OTHER PUBLICATIONS

Stegenga et al., Stability of Carbon–Supported Catalysts in an Oxidizing Environment, Carbon, vol. 30, pp. 577–585, 1992.

Peters et al., Catalytic Reduction of Nitric Oxide with Carbon Monoxide by Rare Earth Oxides, Atmospheric Environment, vol. 11, pp. 459–463, 1977.

Wang et al., Effects of Acidic Treatments on the Pore and Surface Properties of NI Catalyst Supported on Activated Carbon, Carbon, vol. 36, No. 3, pp. 283–292, 1998.

Zhang et al., Hydrothermal Stbility of Cerium Modified Cu–ZSM–5 Catalyst for Nitric Oxide Decomposition, Journal of Catalysis 164, pp. 145, 1996.

Salas–Peregrin et al., Nitric Oxide Reduction Over Carbon Supported Palladium Catalysts, Applied Catalysis B: Environmental 8, pp. 79–100, 1996.

Gao et al., Influences of Acid Treatments of Active Carbons on No Reduction Over Carbon–Supported Copper Oxides, React. Kinet. Catal. Lett., vol. 59, No. 2, pp. 359–366, 1996.

Mitome et al., Role of Lanthanide Elements on the Catalytic Behavior of Supported Pd Catalysts in the Reduction of NO with Methane, Catalysis Today 53, pp. 597–606, 1999.

Mitome et al., Effect of $H_2O$ and $SO_2$ on the Activity of $Pd/TiO_2$ Catalysts in Catalytic Reduction of NO with Methane in the Presence of Oxygen, Catalysis Today 42, pp. 3–11, 1998.

Kumthekar et al., Nitric Oxide Reduction with Methane over $Pd/TiO_2$ Catalysts, Journal of Catalysis 171, pp. 45–53, 1997.

Ozkan et al., Self–Sustained Oscillatory Behavior of NO $+H_4 +O_2$ Reaction Over Titania–Supported Pd Catalysts, Journal of Catalysis 171, pp. 67–76, 1997.

(List continued on next page.)

Primary Examiner—Stanley S. Silverman
Assistant Examiner—Maribel Medina
(74) Attorney, Agent, or Firm—Standley Law Group LLP

(57) ABSTRACT

The present invention includes a supported catalyst for the reduction of nitrogen oxides ($NO_x$) with a lower hydrocarbon. The supported catalyst comprising at least one active metal and at least one promoter metal attached to a support. The support may additionally include activated carbon. The promoter metals may be chosen from the lanthanide metals and the active metals may be chosen from palladium or platinum. The invention also includes a method of making the above mentioned catalysts and a method of using the catalysts to reduce nitrogen oxides ($NO_x$) with a lower hydrocarbon.

16 Claims, 15 Drawing Sheets

OTHER PUBLICATIONS

Armor, Catalytic Reduction of Nitrogen Oxides with Methane in the Presence of Excess Oxygen: A Review, Catalysis Today 26, pp. 147–158, 1995.

Nishizaka et al., Catalytic Reduction of Nitrogen Monoxide by Methane Over Palladium–Loaded Zeolites in the Presence of Oxygen, Chemistry Letters, pp. 1295–1298, 1993.

Cho et al., Kinetics of NO Reduction by CO Over Supported Rhodium Catalysts: Isotopic Cycling Experiments, Journal of Catalysis 115, pp. 486–499, 1989.

Oh, Effects of Cerium Addition on the CO–NO Reaction Kinetics Over Alumina–Supported Rhodium Catalysts, Journal of Catalysis 124, pp. 477–487, 1990.

Zafiris et al., Evidence for Low–Temperature Oxygen Migration from Ceria to Rh, Journal of Catalysis 139, pp. 561–567, 1993.

Schwartz et al., Reactivity and Microstructure of Rh and Rh–Ce in NO+Col, Journal of Catalysis 148, pp. 22–29, 1994.

Zafiris et al., A Study of CO, NO, and $H_2$ Adsorption on Model $Pt/CeCeO_2$ Catalysts, Surface Science 276, pp. 86–94, 1992.

González–Velasco et al., Preparation, Activity and Durability of Promoted Platinum Catalysts for Automotive Exhaust Control, Applied Catalysis B: Environmental 3, pp. 191–204, 1994.

Marecot et al., Effect of the Preparation Procedure on the Properties of Three–Way Automotive Platinum–Rhodium/Alumina–Ceria Catalysts, Applied Catalysis B: Environmental 5, pp. 43–55, 1994.

Muraki et al., Nitric Oxide Reduction Performance of Automotive Pallladium Catalysts, Applied Catalysis 48, pp. 93–105, 1989.

Hu et al., Design of a Novel Pd Three–Way Catalyst: Integration of Catalytic Functions in Three Dimensions, Catalysis Today 30, pp. 83–89, 1996.

Kay et al., High Temperature Thermodynamics and Applications of Rare Earth Compounds Containing Oxygen and Sulphur in Fuel Gas Desulphurization and $SO_x$ and $NO_x$ Removal, Journal of Alloys and Compounds 192, pp. 11–16, 1993.

Shyu et al., Characterization of Pd/γ–Alumina Catalysts Containing Ceria, Journal of Catalysis 114, pp. 23–33, 1988.

Shyu et al., Characterization of Pt/γ–Alumina Catalysts Containing Ceria, Journal of Catalysis 115, pp. 16–23, 1989.

Cho, Chemical Modification of Catalyst Support for Enhancement of Transient Catalytic Activity: Nitric Oxide Reduction by Carbon Monoxide Over Rhodium, Journal of Catalysis 131, pp. 74–87, 1991.

Dziewiecka et al., $NO_x$ Reduction with Hydrocarbons Over Some Oxide Catalysts, Catalysis Today 17, pp. 121–130, 1993.

Burroughs et al., Satellite Structure in the X–Ray Photoelectron Spectra of Some Binary and Mixed Oxides of Lanthanum and Cerium, J. Chem. Soc. Dalton Trans. 27, pp. 1686–1699, 1976.

Christopher et al., Surface Characterization and Catalytic Activity of $Ln_2Ti_2O7$ (Ln=Y, Sm, Gd and Tb), Journal of Materials Science 26, pp. 4966–4970, 1991.

Nishizaka et al., Essential Role of Acidity in the Catalytic Reduction of Nitrogen Monoxide by Methane in the Presence of Oxygen Over Palladium–Loaded Zeolites, Chemistry Letters, pp. 2237–2240, 1994.

* cited by examiner

CATALYST AND METHOD OF USE IN THE REDUCTION OF NITROGEN OXIDES USING LOWER HYDROCARBONS This invention was made with U.S. Government support under National Science Foundation Contract Grant No. CTS-9412544. Accordingly, the U.S. Government has certain rights in this invention.

TECHNICAL FIELD OF THE INVENTION

The present invention is in the field of catalysts used in the catalytic reduction of nitrogen oxides ($NO_x$) using lower hydrocarbons.

BACKGROUND OF THE INVENTION

Nitrogen oxide ($NO_x$) reduction with hydrocarbons has recently attracted attention due to stricter environmental regulations. Pollution of the atmosphere by $NO_x$ emission from combustion sources continues to be a major environmental concern. $NO_x$ emissions are linked to acid rain, increased ground-level ozone concentrations that lead to urban smog, respiratory problems, adverse effects on terrestrial and aquatic ecosystems, and depletion of the stratospheric ozone layer.

Using methane as a reducing agent has certain advantages since it is the least expensive lower hydrocarbon and exists abundantly in natural gas. There have been numerous studies in the literature on NO reduction over ZSM-5 supported catalysts (zeolite supported) using hydrocarbons including methane. In some studies precious metals such as palladium were incorporated in to the zeolite using the ion exchange method. $Pd^{2+}$ exchanged H-ZSM-5 and Pd—H—Ce-ZSM-5 display considerable activity for NO reduction using methane in the presence of oxygen. Acidity is essential for this reaction to take place.

Ceria is widely recognized as a type of oxygen scavenging material. Many studies on three way catalysts can be found in the literature. Investigation of NO+CO reactions over alumina supported rhodium catalysts doped with ceria or ceria supported rhodium catalysts have been studied extensively. Using the interaction between Pd and Ce, new catalyst designs have been developed.

Recently, many researchers have focused on the use of ceria. Zhang and Stephanopoulos in *J. Catal.* 164 (1996) 131, investigated the effect of the addition of Ce(II) ions on the activity and hydrothermal stability Cu-ZSM-5 for NO decomposition. They found that the presence of cerium suppressed CuO particle formation and dealumination, providing higher hydrothermal stability for zeolite structure and higher copper dispersion.

Along with the reaction/mechanistic studies, thermodynamic properties of cerium and lanthanum compounds containing oxygen and sulfur have been studied by Kay et al. (see *J. Alloys and Compounds*, 192 (1993) 11). Characterization of Pt/γ-alumina containing ceria has been extensively studied by Shyu et al. (see *J. Catal.*, 114 (1988) 23 and *J. Catal*, 115 (1989) 16) which provides insight to the effect of Pd and Pt on the reduction/oxidation of ceria.

In an effort to improve the oxygen storage/transport characteristics, Cho (*J. Catal*, 131 (1991) 74) has incorporated gadolinia onto a commercial ceria powder. Dziewiecka et al. (*Catal. Today*, 17 (1993) 121) studied NO reduction with hydrocarbons over a series of copper-gadolinia oxide catalysts supported on thermal resistant carriers. They both found that NO reduction activity was increased by the presence of gadolinia.

There are several reports on the literature concerning the use of active carbons as supports for different catalysts. Stegenga et al. (*Carbon*, 30 (1992) 577) looked into the stability of carbon-supported catalysts in such environments. Several methods to increase the resistance to oxidation were considered. One method was to pre-treat the carbon at high temperatures (2000° C.), which caused a decrease in active site density and consequently resulted in higher oxidation resistance. On the other hand, treatment with boron or phosphorus compounds did not result in satisfactory protection of the carbon against oxygen. A very successful method was to cover the interior surface of the carbon with a Si compound, which is transformed into silica and subjected to heat treatment in an inert gas. Gasification of the support was prevented due to the formation of SiC, which is highly resistant to oxidation. Besides retaining a considerably high surface area (600–700 $m^2/g$), this support greatly improved its mechanical strength.

In another study, Gao et al. (*Catalysis Letters*, 59 (1996) 359) investigated the influence of acid treatments of active carbons on NO reduction over carbon supported copper oxides. A remarkable discovery is the fact that the conversions of NO reduction show a strong dependence on surface oxygen containing groups on the active carbons, and that carboxylic and lactonic sites noticeably favor the NO reduction. Consequently, the conversions in the NO reduction over CuO supported on activated carbon depend strongly on the kind of acid pretreatment of the carbons. Concentrated nitric acid can increase the amount of lactonic and carboxylic sites on the carbon surfaces, in contrast to hydrochloric acid, that leads to a remarkable decomposition of those sites.

Salas-Peregrin et al. (*Applied Catalysis B*, 8 (1996) 79) looked into the NO reduction over carbon-supported palladium catalysts. According to these researchers, the presence of very low amounts of Pd gives active and stable catalysts towards the NO—CO reaction. It is reported that the presence of CO lowers the consumption of the carbon support by NO.

Pore and surface properties of activated carbon supports can be significantly affected by acid treatments. Wang and Lu (*Carbon*, 36 (1998) 283) found that acid treatment generally caused an increase in surface area and pore volume of carbon supports because the acid removed impurities. In particular, these authors used $Ni^{2+}$ supported on activated carbons. Although this study focused on physical properties of the supports, catalytic activity tests were also carried out on methane reforming with carbon dioxide, showing that the activity of this catalysts is greatly influenced by the acid treatment of the support.

It is therefore an object of the current invention to develop a supported catalyst for the reduction of nitrogen oxides ($NO_x$) that may be modified using lanthanide metals such as Ce, Gd, La, and Yb in an effort to increase the oxygen tolerance. Additionally, activated carbon (A.C.) may be added to the catalyst support to yield a catalyst with better catalytic properties than those catalysts supported on titania or activated carbon only.

SUMMARY OF THE INVENTION

This invention relates to a catalyst prepared and used in the catalytic reduction of nitrogen oxides ($NO_x$) using lower hydrocarbons. The invention relates to a supported catalyst comprised of at least one active metal and at least one promoter metal attached to a support.

The active metal is comprised of palladium or platinum and mixtures thereof and is present in a range of 0.1% to 30% and preferably in the range of 0.1% to 5%.

The promoter metal is selected from lanthanide metals and mixtures thereof and is present in a weight range of 0.1% to 20% and preferably in the range of 0.1% to 5%.

The ratio of active metal to promoter metal is preferably 2:1.

The support comprises titanium dioxide. The catalyst may additionally contain activated carbon (A.C.). When the support is titanium dioxide together with activated carbon the preferable ratio of titanium dioxide to activated carbon is about 3:1.

The catalysts of the present invention may be prepared using a wet impregnation technique or a modified sol-gel method. When using the modified sol-gel method the catalyst may be prepared in a solution. The solution may be any solvent that can dissolve titanium alkoxides. The solution may be selected from water, alcohol, hexane, benzene or other polar-aprotic solvents to name a few. If alcohol is used, it may comprise pure or mixed alcohols selected from the group consisting of methanol, ethanol, propanol, isopropanol, and butanol. The active metal-containing precursor, as used herein, may be palladium acetate. The promoter metal-containing precursor, as used herein, may be gadolinium nitrate or cerium nitrate.

The titanium alkoxide may include $Ti(OR)_4$, where R can be $CH_3$, $C_2H_5$, linear $C_3H_7$, branched $C_3H_7$ (isopropyl) or $C_4H_9$. It is preferably titanium isopropoxide or titanium oxide.

The invention also includes a method of using the catalyst in the reduction of nitrogen oxides ($NO_x$) using lower hydrocarbons. As used herein, lower hydrocarbon is any compound with $C_{1-6}$ and is preferably selected from the group consisting of alkanes, alkenes, and alkynes. More preferably selected from the group consisting of methane, ethane, propane, ethylene and propylene. And most preferably methane.

The present invention is to a method of reducing nitrogen oxides ($NO_x$) with at least one lower hydrocarbon using a catalyst, the method comprising the steps of: a) obtaining a supported catalyst, the catalyst comprising at least one active metal and at least one promoter metal attached to a support, wherein the at least one active metal comprises palladium, the support arising from the polymerization of at least one precursor thereof, the at least one active metal and the at least one promoter metal having been attached to the support by the at least one active metal and the at least one promoter metal having been co-precipitated with the precursor of the support; and b) bringing nitrogen oxides and lower hydrocarbon into contact with the catalyst for sufficient time and at sufficient temperature so as to allow nitrogen oxide to be reduced.

The active metal, promoter metal, support and lower hydrocarbon have all been defined above.

DETAILED DESCRIPTION OF THE PREFERRED EMBODIMENT(S)

Figures 1A, 1B:
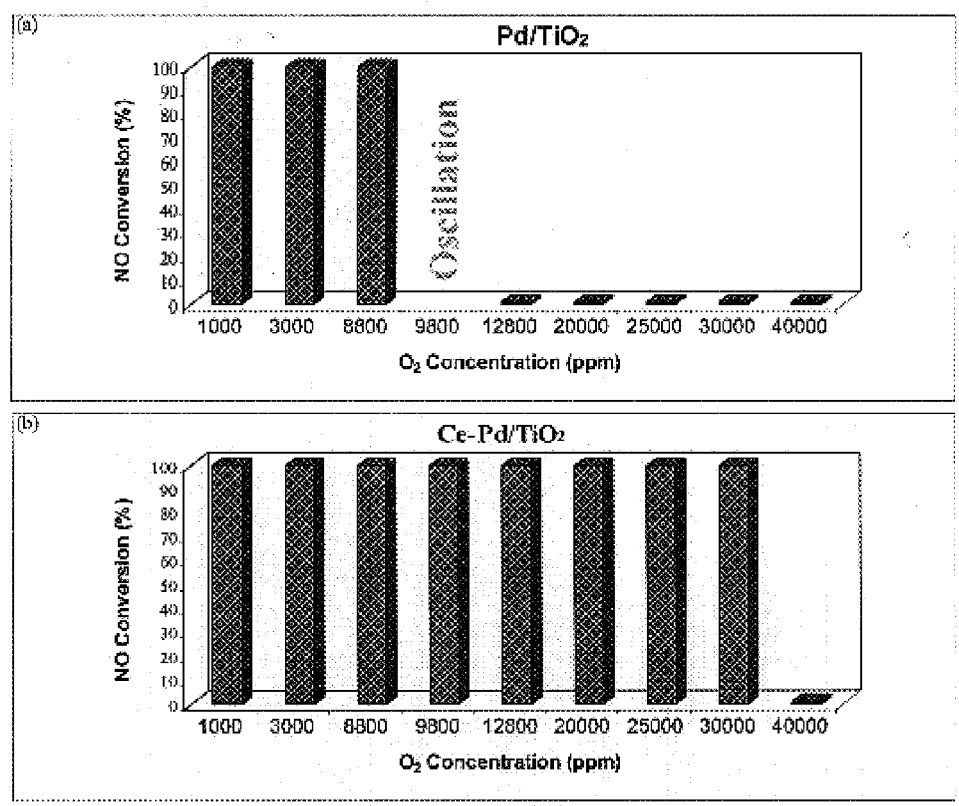
FIG. 1 is a set of four bar graphs, labeled (a)–(d), showing NO conversion with increasing $O_2$ concentration for various catalysts, in accordance with one embodiment of the present invention.

In accordance with the foregoing summary, the following presents a detailed description of the preferred embodiment of the invention that is currently considered to be the best mode.

EXAMPLE 1

Catalyst Preparation

The catalysts used in this study, 1%Ce/$TiO_2$, 2%Pd/$TiO_2$, 1%Ce/2%Pd/$TiO_2$, and 1%Gd/2%Pd/$TiO_2$, were prepared by a wet impregnation technique and a modified sol-gel method. Precursors utilized were palladium acetate, titanium (IV) oxide, cerium nitrate, gadolinium nitrate, titanium (IV) isopropoxide, all obtained from Aldrich. Palladium acetate and cerium nitrate were impregnated into an acetone solution containing titanium (IV) oxide. The solution was dried over night with agitation followed by calcination under oxygen at 500° C. for 4 hours with heating and cooling rates of 10° C./min. In a modified sol-gel method, palladium acetate was dissolved completely in isopropyl alcohol followed by addition of titanium (IV) isopropoxide. The titanium precursor was hydrolyzed drop-wise by an aqueous solution containing gadolinium nitrate. The solution was dried over night with stirring under ambient conditions followed by calcination under oxygen at 500° C. for 4 hours with heating and cooling rates of 4.5° C./min. The BET surface areas of these catalysts were measured using nitrogen adsorption to be 19, 12, and 79 $m^2$/g for 2%Pd/$TiO_2$, 1%Ce/2%Pd/$TiO_2$, and 1%Gd/2%Pd/$TiO_2$, respectively.

Catalyst Characterization

Surface characterization techniques used in this study included X-ray photoelectron spectroscopy (XPS), temperature programmed desorption (TPD), BET surface area measurements. The controlled-atmosphere X-ray photoelectron spectra of reduced and post reaction samples were obtained by a Physical Electronics/Perkin Elmer (Model 550) ESCA/Auger spectrometer, operated at 15 kV and 20 mA. Al $K_\alpha$ radiation (hv=1486.6 eV) was used as the X-ray source. The charge shift was corrected using the binding energy of C 1s (284.6 eV) as a reference.

TPD experiments were carried out using a homemade TPD set-up, which is capable of in-situ calcination and reduction. Desorption species were detected by a quadruple mass spectrometer (5989A HP). All samples were pretreated with oxygen at 500° C. for 2 hours followed by reduction at 200° C. by a mixture of 33% $H_2$ in He for 2 hours before an adsorbate was introduced. Samples were heated at 10° C./min from room temperature to 700° C.

Reaction Studies

The steady-state reaction experiments were performed using a fixed-bed flow reactor (¼" O.D.) made of stainless steel. The amount of catalyst packed was varied between 37.5 to 69 mg. The feed composition consisted of NO (500 to 1780 ppm), $CH_4$ (1.065 to 2.13%), $O_2$ (0.1 to 4.3%), $SO_2$ (0 to 145 ppm), and $H_2O$ (0 to 7%) in balance He at flow rates between 30 to 61 $cm^3$ (STP)/min. The reaction temperature was varied between 400 to 500° C. which was controlled by a PID temperature controller (Omega). In each reaction, the sample was pre-reduced using a mixture of 33% $H_2$ in He at 200° C. for 30 minutes. The system was facilitated with a syringe pump to accommodate the water injection during steady-state reaction experiments. All lines were heated at 136° C. to prevent the condensation of water. The feed and effluent were analyzed on-line using a combination of a gas chromatograph (5890A HP), a chemiluminescnece $NO—NO_2—NO_x$ analyzer (Themo Environmental Instruments, Model 42H), and an IR ammonia analyzer (Siemens Ultramat 5F). The gas chromatograph was equipped with a 10 ft×⅛" Porapaq Q column and a 8 ft×⅛" molecular sieve column to quantify $N_2$, $O_2$, CO, $CO_2$, $CH_4$, $N_2O$, and $SO_2$. In all experiments, nitrogen and carbon balances were close to 100%.

Results and Discussion

Effect of Ce and Gd

Figures 1C, 1D:
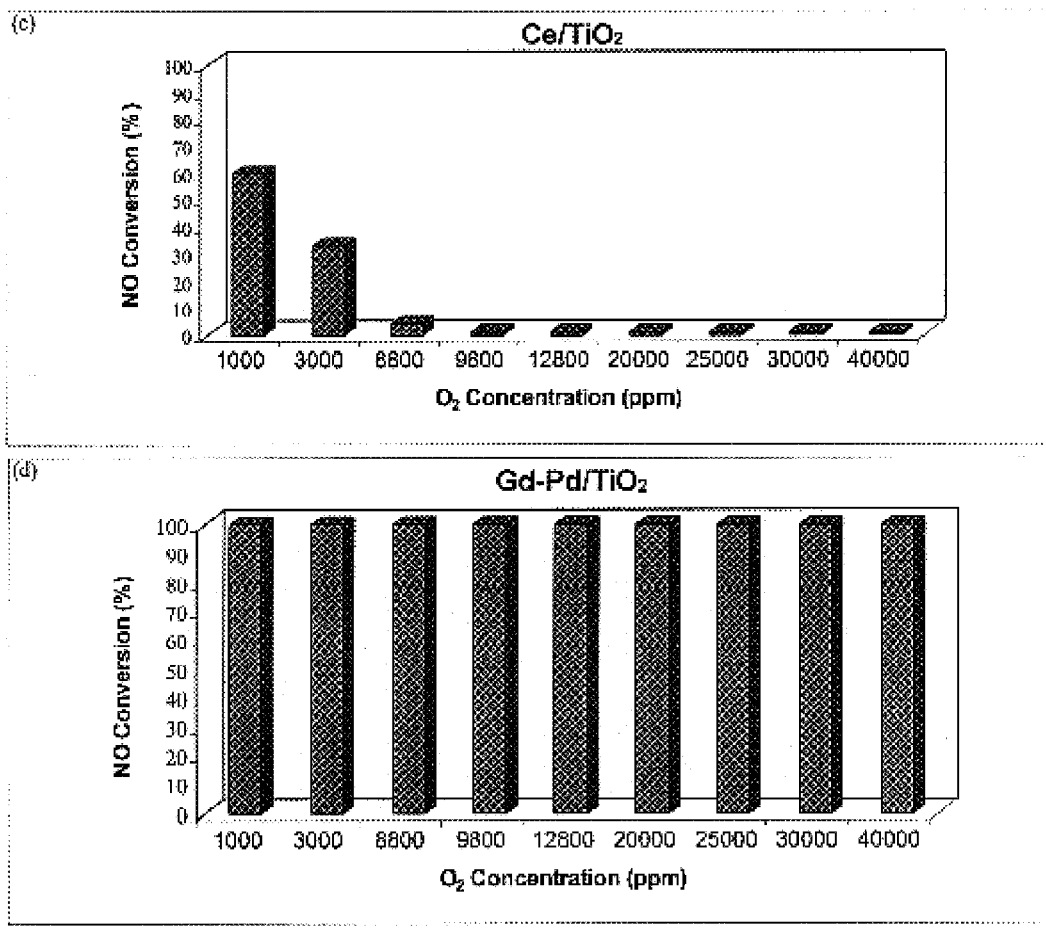

The 2%Pd/$TiO_2$ catalyst was effective in reducing NO by methane in the presence of $O_2$. However at a certain $O_2$ concentration and at each temperature level, self-induced oscillations in feed and product were observed. To eliminate the oscillations, we have modified the catalyst by adding various lanthanide metals at different loading levels. Lanthanide metals investigated in this study were Ce, Gd, La, and Yb. Between two types of synthesis methods, wet-impregnation and modified sol-gel, catalysts synthesized by the latter method provided higher surface areas by 2 to 10 fold compared to wet-impregnated catalysts. A set of standard reaction conditions (NO=1780 ppm, $CH_4$=2.13%, $O_2$=4% in balance He, 500° C., 61 $cm^3$ (STP)/min) was applied to each catalyst to test its NO reduction activity in the presence of oxygen. FIG. 1 illustrates the results of NO conversion in NO+$CH_4$+$O_2$ reaction at 500° C. over four different catalysts with varying $O_2$ concentration. As we reported previously, 100% NO conversion was obtained up to 8,800 ppm $O_2$ concentration over Pd/$TiO_2$ and the oscillation behavior was observed at 9,800 ppm followed by deactivation of the catalyst. With the wet-impregnated Ce—Pd catalyst, the highest $O_2$ concentration achieved while giving a 100% NO conversion was 30,000 ppm (FIG. 1b). When a catalyst was prepared without Pd (1%Ce/$TiO_2$), it did not work effectively for the reduction of NO (FIG. 1c). The maximum NO conversion was 62% even with 1000 ppm $O_2$ in feed and it continuously decreased with an increase in $O_2$ concentration. The La-, Yb-, Ce-, Gd-doped catalysts synthesized by a modified sol-gel method as well as the Pd-only catalyst, which was prepared by the same method all showed higher oxygen resistance than the wet-impregnated catalysts. However, with addition of Gd, the highest $O_2$ tolerance was achieved while giving a 100% NO conversion (FIG. 1d). No self-induced oscillations were observed in NO—$CH_4$—$O_2$ reaction over Pd/$TiO_2$ catalysts doped with lanthanide metals. As oxygen concentration was increased, methane conversion also increased; however, methane was never totally exhausted in any of the experiments.

In a different set of experiments, we performed a comparison of Pd and Pd/Gd catalysts, which were prepared by the modified sol-gel method, using an above-stoichiometric oxygen concentration. The concentrations of NO, $CH_4$, and $O_2$ were 500 ppm, 1.065%, and 2.15% respectively. We were successfully able to reduce NO with 99.8% conversion with 96.4% selectivity to nitrogen, defined as (2×moles of $N_2$ formed/moles of NO converted) while Pd-only catalyst only gave a 4.7% conversion of NO.

Figure 2:
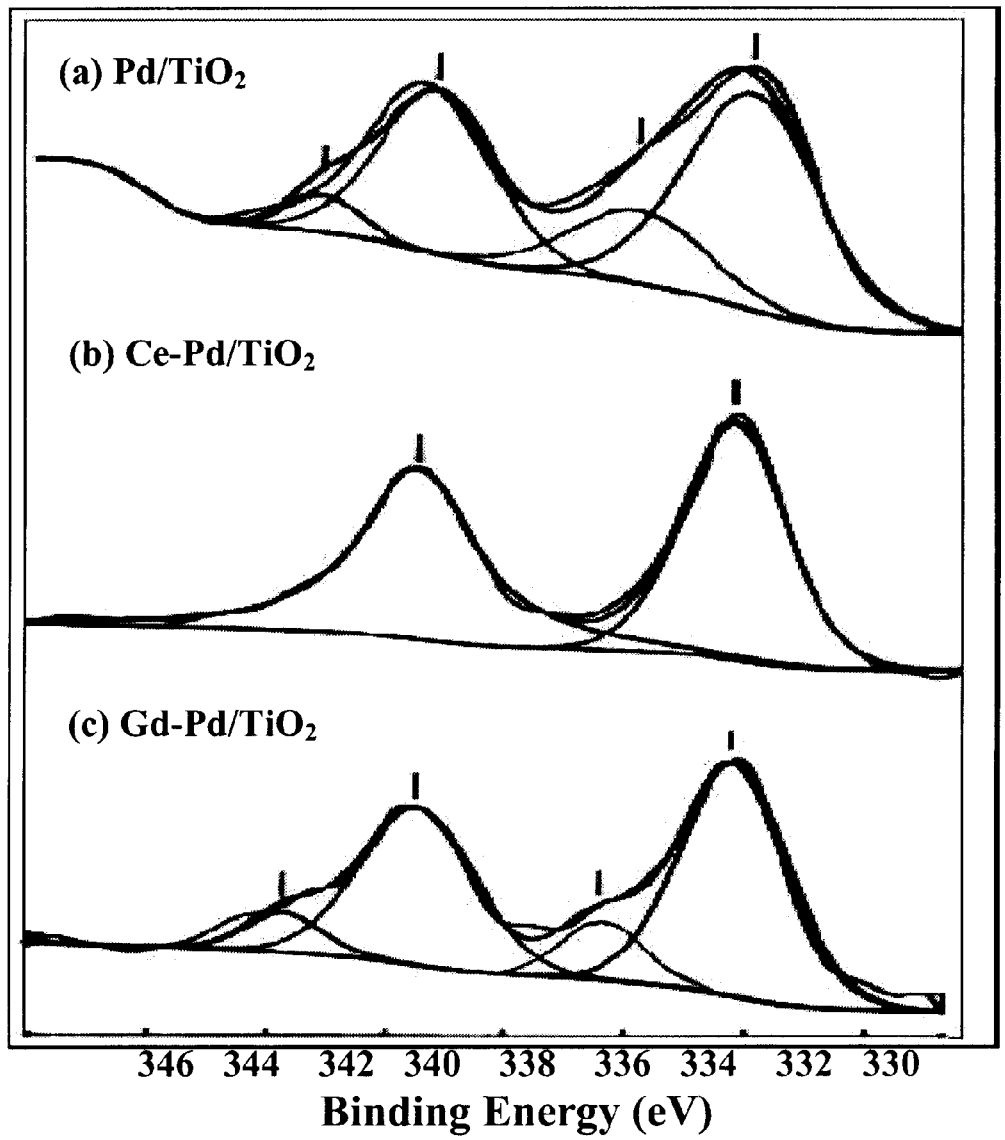
FIG. 2 is a Pd 3d controlled-atmosphere XPS spectra of reduced catalysts, in accordance with one embodiment of the present invention.

We narrowed our focus on surface characterization to the most promising SCR catalysts; namely, Ce- and Gd- doped catalysts. FIG. 2 presents the Pd 3d X-ray photoelectron spectra of reduced Pd/$TiO_2$, Ce—Pd/$TiO_2$, and Gd—Pd/$TiO_2$ catalysts. The reduction of catalysts were performed in a mixture of 33% $H_2$ in He for 30 minutes at 200° C. and transferred to the XPS chamber without exposing them to the atmosphere. The Pd $3d_{5/2}$ and Pd $3d_{3/2}$ peaks at zero oxidation state are present at 334.1 and 339.5 eV, respectively. The completely oxidized catalyst gave Pd $3d_{5/2}$ and Pd $3d_{3/2}$ peaks at 335.3 and 340.5 eV, respectively. On the reduced Pd/$TiO_2$ catalyst, Pd was found to exist in both oxide and metallic phases. Deconvolution of these peaks showed that 79% of palladium was in zero state and 21% was in +2 state (FIG. 2a). Interestingly, when Ce (1 wt %) was added to the Pd/$TiO_2$ catalyst, 100% of surface palladium was found in metallic phase after it was treated under the same conditions (FIG. 2b). When the lanthanide dopant was changed from Ce to Gd, it showed a change in reducibility of palladium. FIG. 2c shows that 1%Gd/2%Pd/$TiO_2$ catalyst maintains 84% of the Pd sites in the metallic phase; however, 16% remained in the oxide phase.

Figure 3:
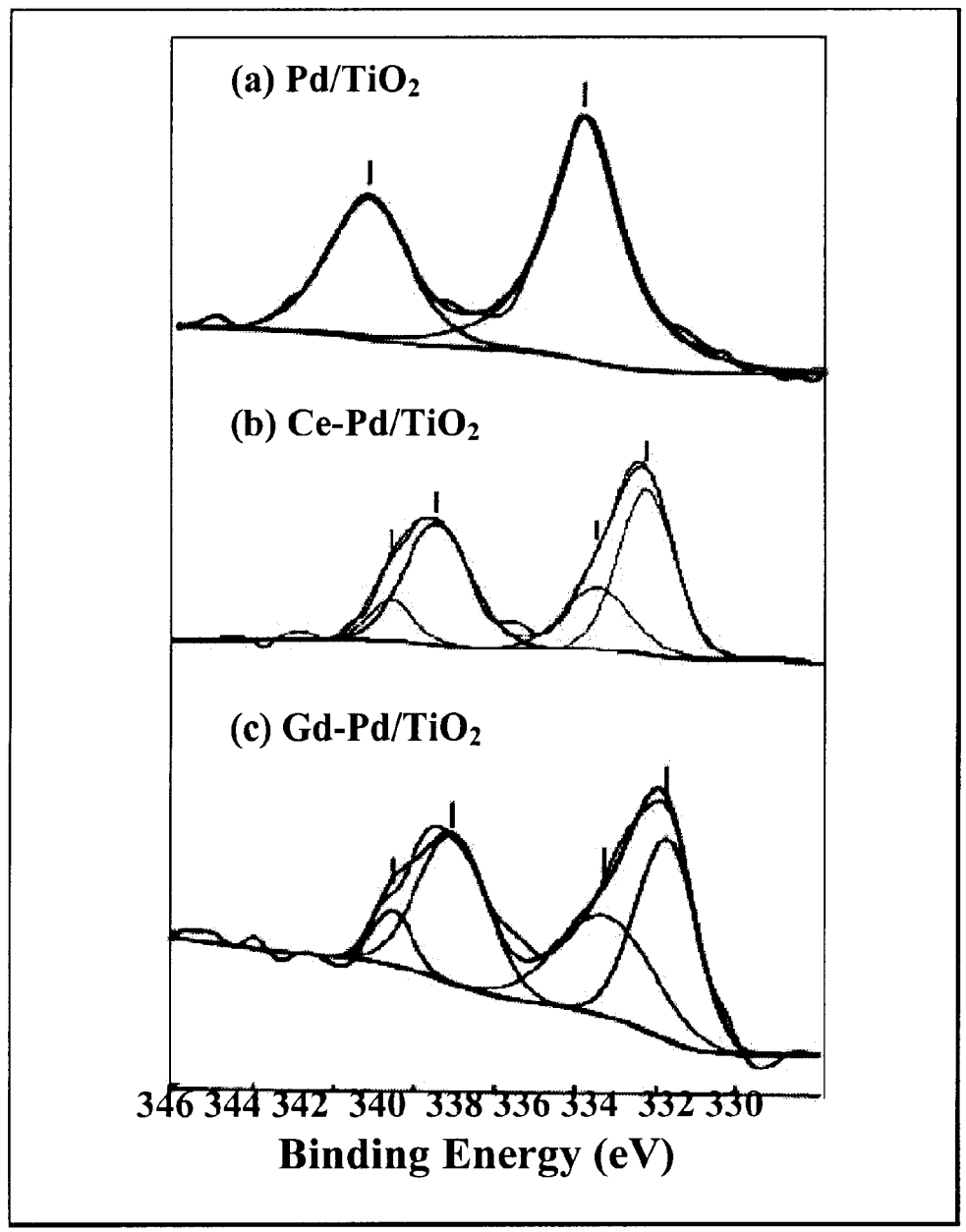
FIG. 3 is a Pd 3d controlled-atmosphere XPS spectra of post-reaction catalysts, in accordance with one embodiment of the present invention.

The post-reaction X-ray photoelectron spectra of the same set of catalysts are presented in FIG. 3. The spectrum was taken after our standard reaction conditions were applied to each catalyst and transferred to the XPS chamber without exposing them to the atmosphere. Pd only and Ce—Pd catalysts were subjected to $O_2$ concentration of 30,000 ppm that resulted in immediate deactivation of the former catalyst while the latter sample remained active giving a 100% NO conversion. The $O_2$ concentration for Gd—Pd catalyst was 40,000 ppm, which also gave a 100% NO conversion. FIG. 3a shows the complete oxidation of Pd in the deactivated Pd/$TiO_2$ catalyst. The post-reaction Pd 3d XPS spectrum of Ce—Pd catalyst under the same condition showed that 74% of palladium still remained in metallic phase (FIG. 3b). The post-reaction characterization of the Gd—Pd catalyst also showed that more than 66% of the Pd sites on the surface to be in the zero oxidation state.

Figure 4:
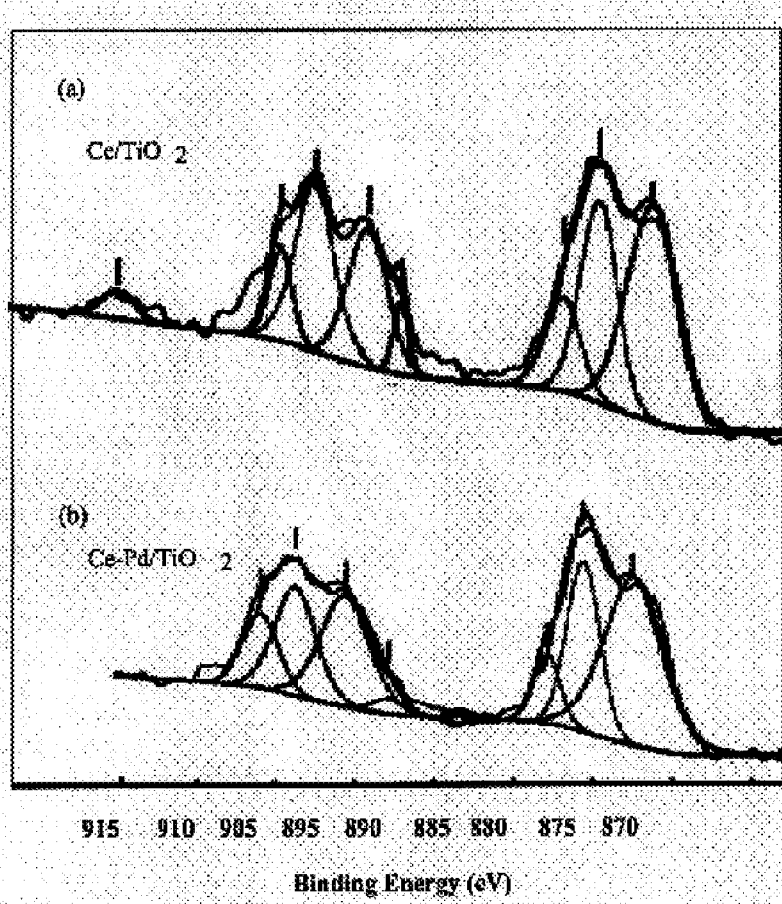
FIG. 4 is Ce 3d controlled-atmosphere XPS spectra of reduced catalysts, in accordance with one embodiment of the present invention.
Figure 5:
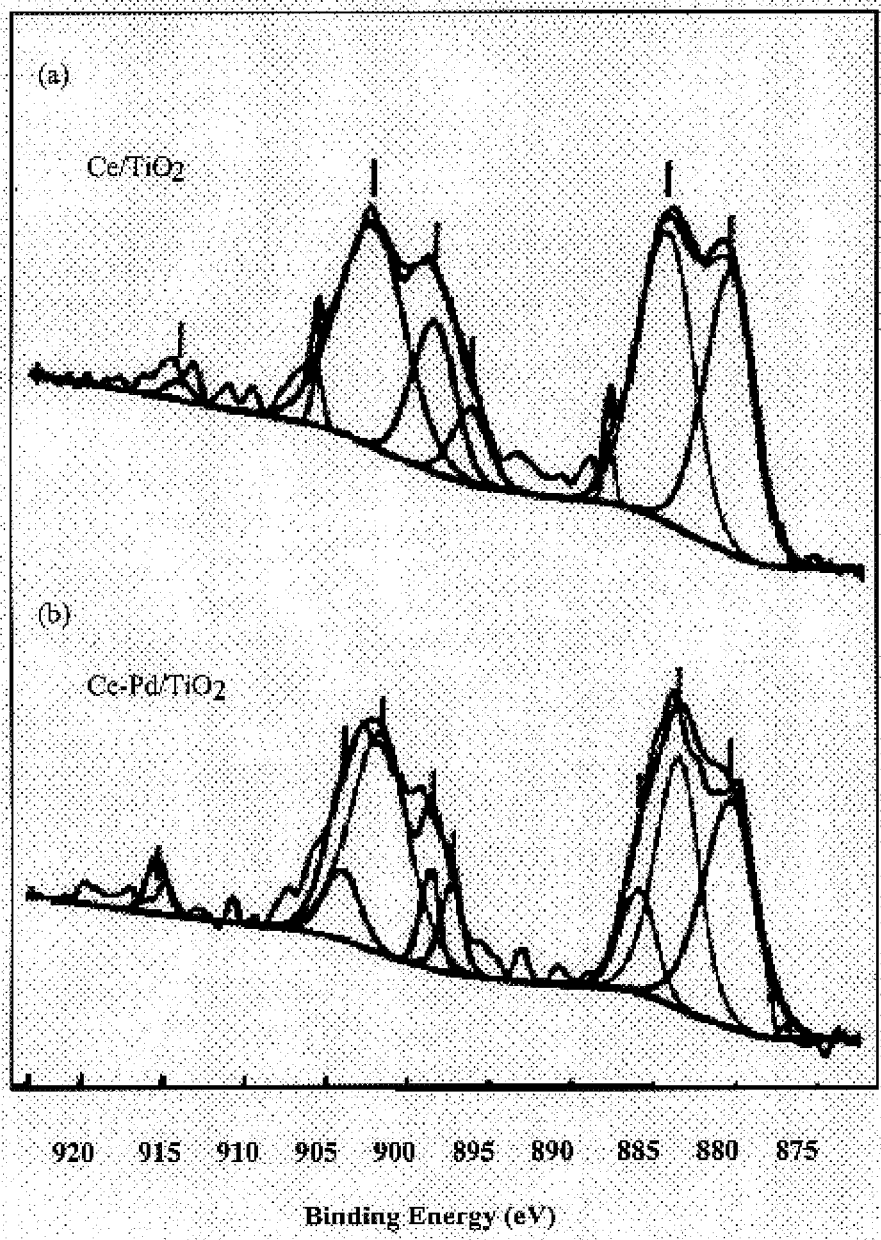
FIG. 5 is Ce 3d controlled-atmosphere XPS spectra of post-reaction catalysts, in accordance with one embodiment of the present invention.

Further, Ce 3d X-ray photoelectron spectra of reduced and post-reacted 1%Ce/$TiO_2$ and 1%Ce/2%Pd/$TiO_2$ catalysts were compared to gain a better understanding of the role of Ce in the chemical state of palladium. Shyu and Otto (*J. Catal.*, 115 (1989) 16) have investigated Pt/γ-alumina system containing ceria and correlated the amount of $CeO_2$ present to the %u''' in Ce3d region where u''' (915.6 eV) represents the satellite peak which appears only with the presence of $Ce^{+4}$. They reported the correlation between %u''' and %$CeO_2$ to be linear. In the reduced XPS spectra, the Ce only catalyst showed a small peak at 915.6 eV whereas Ce—Pd catalyst showed no peak at that binding energy value (FIG. 4). In the post-reaction XPS spectra of Ce only and Ce—Pd catalysts, %u''' were obtained to be 1 and 2%, respectively (FIG. 5). Pure $CeO_2$ should have a u''' area percentage of approximately 13% according to Shyu and Otto. Since both of our post-reaction samples contained a u''' peak percentage no where close to 13%, we can safely conclude that a mixture of +3 and +4 were present after the catalyst was subjected to the reaction conditions. The fact that there was no $CeO_2$ present on the reduced Ce—Pd catalyst indicates that the presence of palladium helps Ceria be in the +3 chemical state. Ceria is considered in the literature as an oxygen scavenging material, which can adjust the surface oxygen concentration during a reaction. The loading of cerium was very small (1 wt %); however, it was enough to keep the palladium from complete oxidation to PdO in the presence of 3% $O_2$ concentration.

Figure 6:
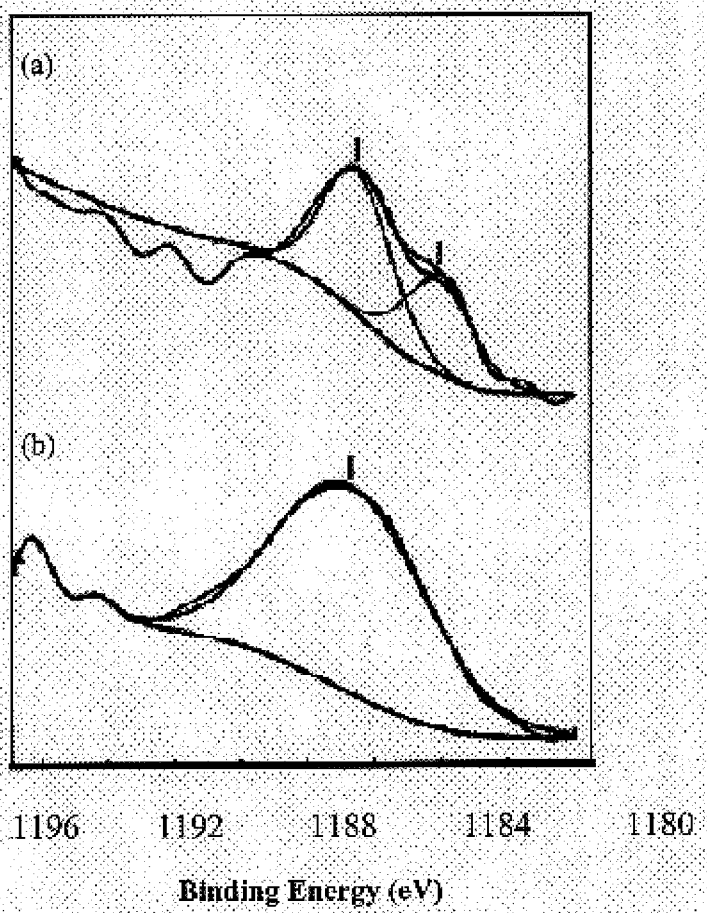
FIG. 6 is Gd $3d_{5/2}$ controlled-atmosphere XPS spectra of Gd—Pd/$TiO_2$ catalyst, in accordance with one embodiment of the present invention.

The Gd $3d_{5/2}$ XP spectrum of reduced Gd—Pd catalyst is illustrated in FIG. 6. The binding energy value in the +3 state of Gd is 1187.5 eV. The satellite feature exhibited as shoulder can be due to the charge transfer processes from O (2P) to Gd (4f). After the reduction of the Gd—Pd catalyst, Gd was observed to be present only in the +3 state as observed in the case of Ce (FIG. 6a). Over the post-reaction sample, we could not obtain a good signal possibly due to low concentration of Gd on surface. However, the Gd—Pd sample, which was treated in oxygen at 500° C. for 4 hours, showed a single peak at 1186.7 eV on the Gd $3d_{5/2}$ XPS spectrum (FIG. 6b). The peak position of Gd $3d_{5/2}$ was in agreement with value reported in the literature. This led us to suggest that under the reaction conditions, Gd would still be still in +3 chemical state.

Effect of $SO_2$

Figure 7:
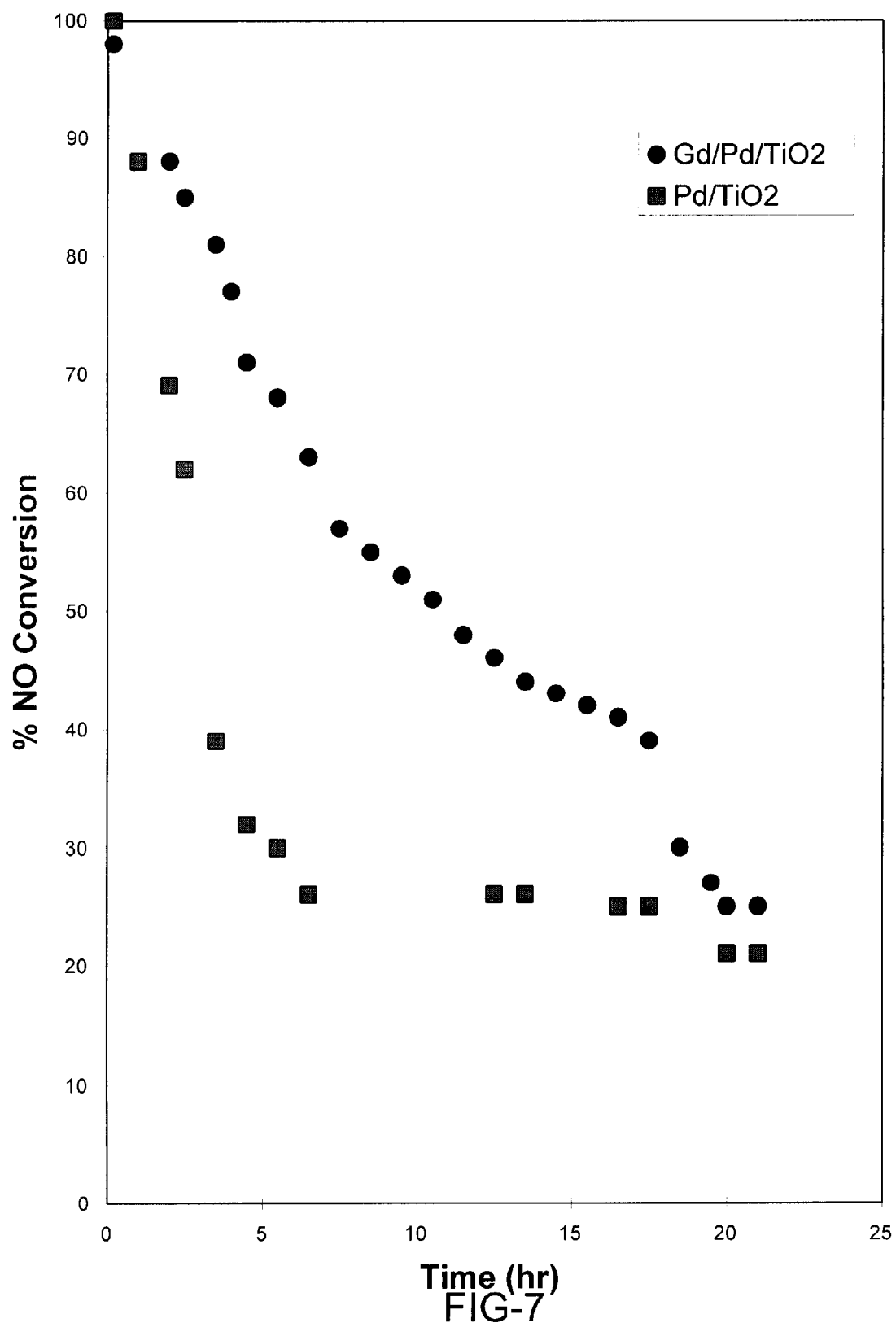
FIG. 7 is NO conversion versus $SO_2$ time graph for, in accordance with one embodiment of the present invention.

The effect of $SO_2$ on the NO reduction with $CH_4$ over supported Pd and Gd—Pd catalysts synthesized by a modified sol-gel method were investigated by performing a steady-state reaction experiments. The feed concentrations used for NO, $CH_4$, $O_2$, and $SO_2$ were 500 ppm, 1.065%, 2%, and 145 ppm, respectively. The flow rate and the temperature used were 45 $cm^3$ (STP)/min and 500° C., respectively. After obtaining a steady state and near complete NO conversion with the NO+$CH_4$+$O_2$ feed mixture, $SO_2$ was added to observe its effect on the catalytic activity. Immediately after the injection of $SO_2$, the NO conversion started dropping slowly but steadily. Over the Gd—Pd catalyst, more than 70% conversion was obtained for over 6 hours after $SO_2$ was added to the feed mixture. Over the Pd only catalyst, a sharper drop was observed. After about 17 hours on stream, the NO conversion reached the steady state around 25%. FIG. 7 shows the variation of NO conversion with time at 0 and 145 ppm of $SO_2$ concentration values during the first 22 hours on stream. The NO conversion on both catalysts dropped significantly; however, the resistance to $SO_2$ was improved moderately by employing different catalyst synthesis technique and adding Gd. We have reported the effect of $SO_2$ over Pd/$TiO_2$ prepared by wet-impregnation to have an immediate and irreversible poisoning effect. Over, the supported Gd—Pd catalyst, the reversibility of the effect of $SO_2$ was examined by removing the $SO_2$ feed after 19 hour of $SO_2$ on stream. The NO conversion increased slightly; however, it did not return to the pre $SO_2$ level.

Figure 8A:
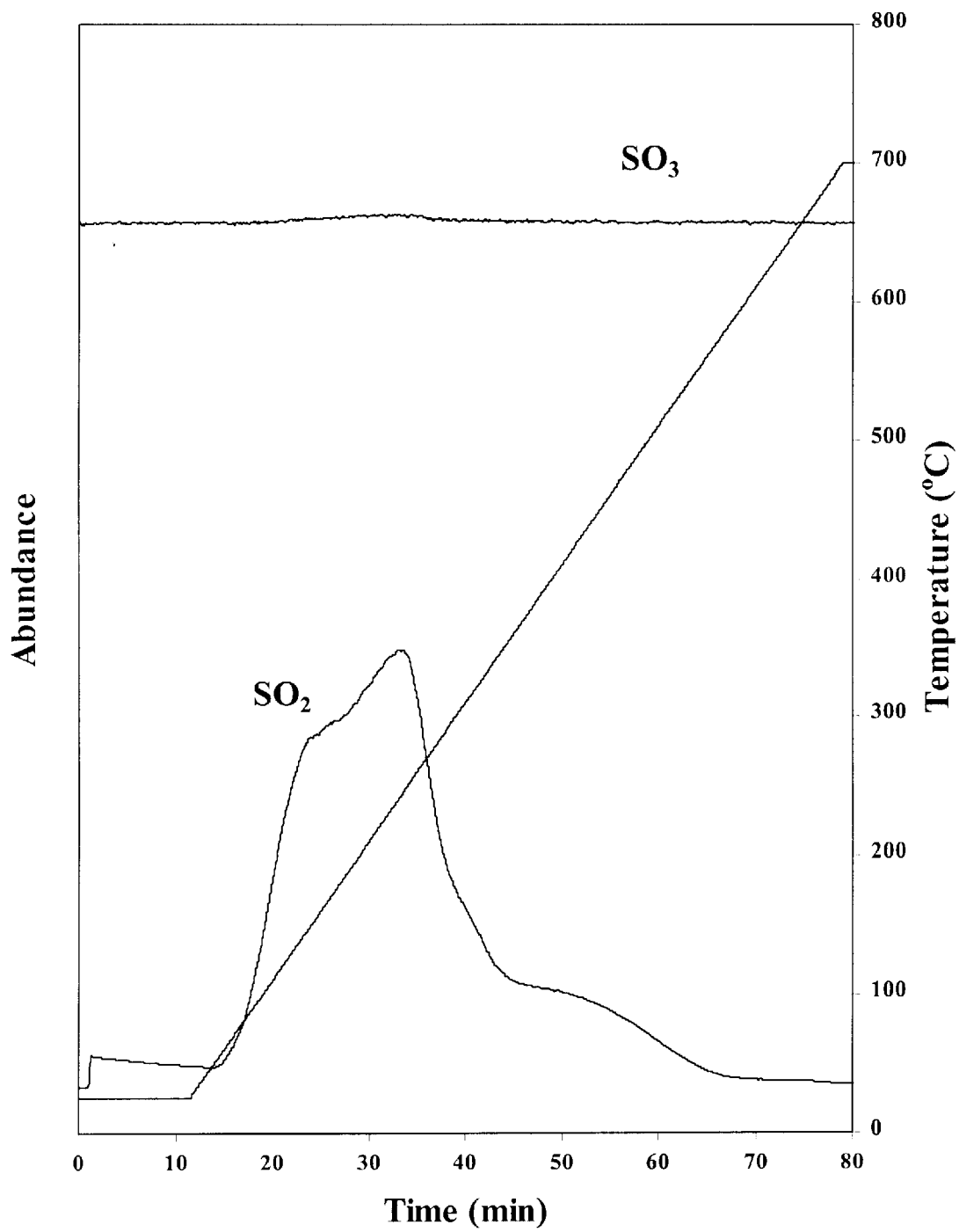
FIGS. 8a and 8b are $SO_2$ temperature program desorption profiles, in accordance with one embodiment of the present invention.
Figure 8B:
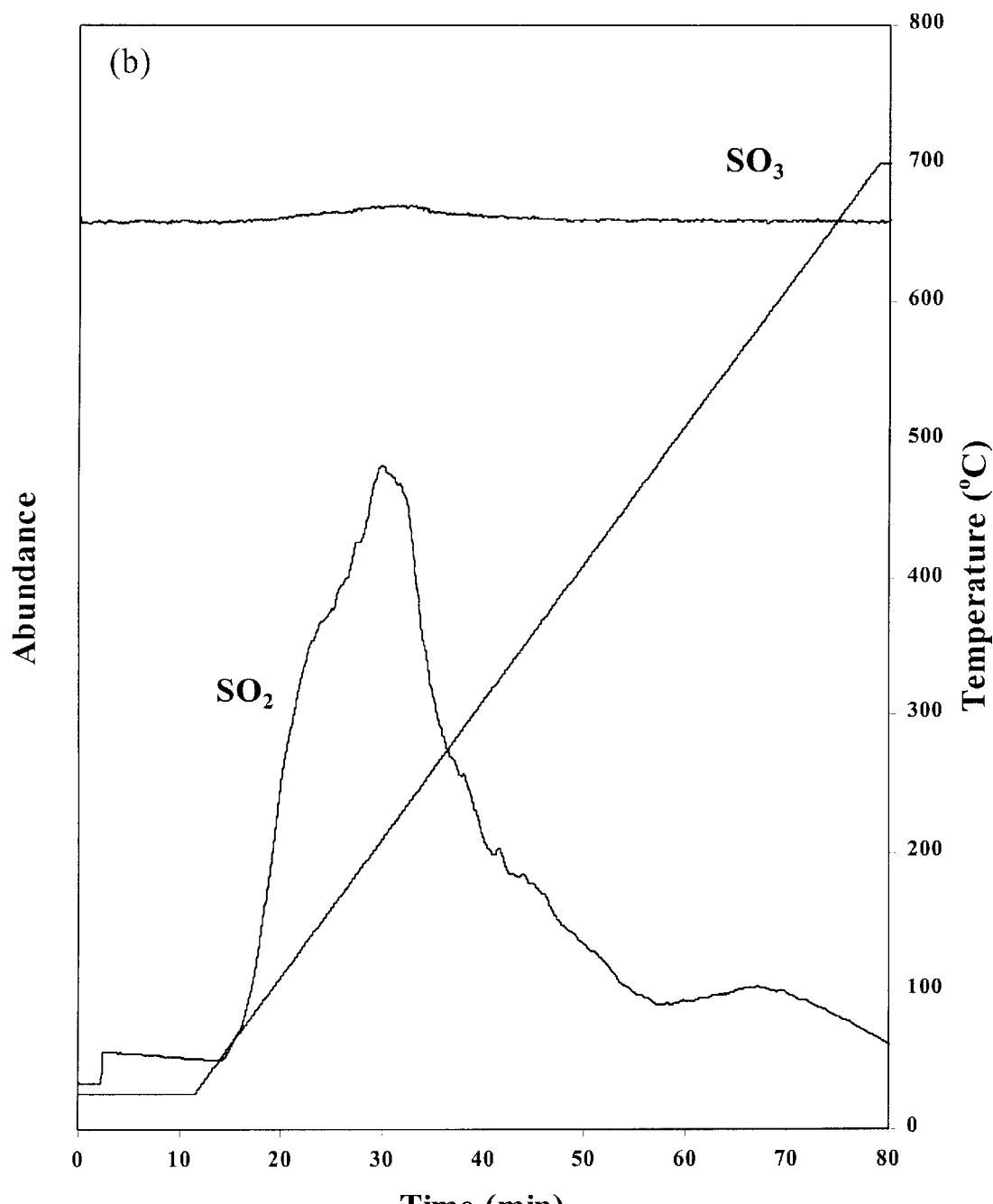

The post-reaction S 2p XPS spectrum of the same catalyst shows a single peak at 168.3 eV which confirms the existence of sulfur on the surface most likely as a sulfate rather than a sulfide. Further validation of sulfate formation could not be obtained from the formation of small shoulder in the O 1s XPS spectrum as we reported previously due to dilute $SO_2$ concentration used in this study. In order to corroborate the formation of sulfate on the catalyst surface with the presence of $SO_2$, TPD experiments were performed using a mixture of 1% molar $SO_2$ in He. The $SO_2$ TPD profiles of reduced Gd—Pd/$TiO_2$ and Pd/$TiO_2$ are presented in FIGS. 8a and 8b, respectively. The $SO_2$ desorption profiles are similar between the two catalysts mainly consisting of two sharp desorption peaks at 150° C. and 250° C. and a broad peak positioning between 350° C. and 580° C. for Gd—Pd/$TiO_2$ and one shifted to a higher temperature range by approximately 100° C. for Pd/$TiO_2$. A small amount of $SO_3$ desorption was also observed indicating that the formation of sulfate was possible.

Effect of $H_2O$

Another stack gas constituent that would be concerned in the reduction of NO over SCR catalysts is $H_2O$. We investigated the effect of $H_2O$ over the Gd—Pd/TiO2 catalyst in the concentration range between 0 and 6.6% in the steady-state reaction experiment. As we performed in the $SO_2$ experiments, we waited until the steady state and a near complete NO conversion were established before the introduction of $H_2O$. The catalyst was on-line for over 18 hours with the addition of water while the NO conversion remained over 99.5%. The nitrogen and carbon-containing species observed in the product stream were $N_2$, $NH_3$ and $CO_2$ that were consistent with those obtained without $H_2O$. The $N_2$ selectivity remained around 96.5% even after the injection of 6.6% water. While the steam reforming reaction between methane and water taking place producing CO and $H_2$ remains a possibility, there was no CO detected. If produced, the concentration of CO would have been smaller than 100 ppm, which is under the GC detection limit. The presence of $H_2$ can increase the $NH_3$ production which, in turn, lower the $N_2$ selectivity. However, there was not much change in $N_2$ selectivity, either.

Conclusions

The addition of Gd to Pd/TiO2 catalyst increased the oxygen tolerance significantly while giving a 100% NO conversion and eliminated the self-induced oscillation behavior.

XPS results indicate that the presence of Gd and Ce helps palladium under the reaction conditions to be mainly in metallic phase.

Over the Gd—Pd catalyst, more than 70% NO conversion was obtained for over 6 hours after $SO_2$ (145 ppm) was added to the feed mixture while a sharper drop in NO conversion was observed over Pd only catalyst.

The presence of $H_2O$ (0 to 6.6%) in the feed mixture did not deactivate the catalyst giving a 99.5% NO conversion and 96.5% $N_2$ selectivity over Gd—Pd catalyst.

EXAMPLE 2

Catalyst Preparation

The catalysts used in this study, 2%Pd/$TiO_2$/A.C. and 1%Gd/2%Pd/$TiO_2$/A.C. were prepared by a modified sol-gel method. Precursors utilized were palladium acetate, titanium (IV) isopropoxide, gadolinium nitrate, and activated carbon, all obtained from Aldrich.

Prior to preparing these mixed support catalysts (titania/activated carbon, 3:1 mole ratio), activated carbon was pretreated with nitric acid. Activated carbon was added to a 2M nitric acid solution and stirred vigorously for three hours at 100° C. After that, the acid solution was drained and the carbon was washed with distilled water repeatedly under vacuum until the pH of the wash water was neutral. The carbon was then dried and calcined under nitrogen atmosphere at 550° C. during 4 hours.

Once the pre-treatment of the carbon was completed, palladium acetate was dissolved in isopropyl alcohol. Then, titanium (IV) isopropoxide was added to the solution under continuous stirring. Activated carbon was subsequently incorporated into the mixture. A solution of gadolinium nitrate in water was added dropwise with a syringe pump to the suspension until a gel was formed. For the Pd-only catalyst, distilled water was used instead of the solution. After that, the gel was allowed to dry overnight and finally it was calcined at 500° C. for 4 hours.

Catalyst Characterization

Surface area measurements were carried out using the BET method with a Micromeritics 2100 E Accusorb Instrument. Nitrogen was the adsorbate for all samples, because the specific surface areas were always higher than 5 $m^2/g$.

Temperature programmed desorption (TPD) experiments were performed in a TPD/TPR setup built in our laboratories and capable of in-situ calcination and reduction. Desorption species were detected by a quadrupole mass spectrometer (5989A HP). In all runs, the catalyst sample was calcined in-situ with oxygen at 500° C. for two hours. And after that, an in-situ reduction with a 2:1 helium/hydrogen mixture was carried out at 200° C. to ensure that the palladium was in the reduced (metallic) state. When the pre-treatment steps were completed, the desired adsorbate(s) was introduced at room temperature. Samples. were heated from that temperature to 700° C. at a rate of 10° C./min.

Reaction Studies

A ¼ inch O.D. stainless steel reactor with a length of approximately 10 cm. was used to perform steady state reaction experiments. All lines were heated to 130° C. to keep water from condensing. In all experiments, a catalyst sample of 69 mg was placed inside the reactor and held in place by silica quartz wool packing. A PID temperature controller (Omega) regulated and displayed the temperature of the reactor (500° C. in most cases). An iron-constantan type J thermocouple (Omega) was placed inside the reactor to measure the exact temperature. An electric furnace manufactured in our laboratories heated the reactor.

Prior to each run, a 33% $H_2$ in He mixture was flowed through the catalyst at 200° C. for 30 minutes in order to have the Pd in the reduced (metallic) state. The feed concentrations were generally 1.065% methane, 0.75–2.25% oxygen, 500 ppm NO ($NO_2$ or $N_2O$ were also tested), 0–145 ppm sulfur dioxide, and 0–7% water. Helium (minimum purity 99.995%) was used as balance gas in all cases and its concentration was chosen accordingly. The system was complemented with a syringe pump to accommodate water injection when necessary. In most reactions, the steady state was reached within 1 hour, but the catalyst was left on line much longer than that to ensure that deactivation did not take place. Typical reaction times were in the order of 4 hours, but when the specific objective of the experiment was to test the resistance to water, sulfur dioxide or other stack gas components, the reaction was allowed to continue overnight, giving a total time of 24 hours or longer.

The reactants and products of the reaction were monitored and quantified by a 5890A HP gas chromatograph (nitrogen, oxygen, methane, carbon monoxide, and carbon dioxide), by an IR ammonia analyzer (Siemmens Ultramat 5F) and by a chemiluminescence $NO$—$NO_2$—$NO_x$ analyzer (Thermo Environmental Instruments, Model 42H). Nitrogen and carbon balances were always close to 100%.

Results and Discussion

NO Catalytic Reduction

The mere fact of incorporating activated carbon into the sol-gel titania (3:1 molar ratio titania to activated carbon) boosted the surface area of the catalyst. Specifically, the surface area of the 2%Pd/$TiO_2$/A.C. catalyst was almost 3.5 times higher than the 2%Pd/$TiO_2$. In the case of the 1%Gd/2%Pd/$TiO_2$/A.C. sample, the increase was even more dramatic: 7 times higher than the corresponding 1%Gd/2%Pd/$TiO_2$ sample.

These significant differences in specific surface area are totally attributable the activated carbon, and the proof is that when the surface area of the activated carbon support was measured, without any titania or active metals present in it, it yielded a value of 990 $m^2/g$.

Steady state reactions were carried out to find out about the activity of the catalysts. The 2%Pd/$TiO_2$/A.C. catalyst showed a remarkable two-fold increase in the oxygen resistance with respect to the 2%Pd/$TiO_2$. But better still, the 1%Gd/2%Pd/$TiO_2$/A.C. easily overcomes the 2.15% oxygen resistance limit of the 1%Gd/2%Pd/$TiO_2$ catalyst, yielding full NO conversion and good nitrogen selectivity even at 2.25% $O_2$. Even at 2.5% $O_2$ it works for a few hours before being deactivated by the excess oxygen present in the feed.

These results prove the synergistic effect of activated carbon and titania when mixed together as catalyst supports. Interestingly, however, the nitrogen selectivity is lower in these catalysts, probably because the hydrogen bound to the activated carbon produces some extra ammonia. Table 1 offers a comparison of titania-only vs. activated carbon titania catalysts.

TABLE 1

| Catalyst sample | S.A. ($m^2$/g) | Max % $O_2$ | % NO conv | % $N_2$ select | % $NH_3$ select | % $N_2O$ select | % $CO_2$ select | % CO select |
|---|---|---|---|---|---|---|---|---|
| 2% Pd/$TiO_2$ | 80 | 0.75 | 98.5 | 92 | 8 | 0 | 100 | 0 |
| 2% Pd/$TiO_2$/AC | 277 | 1.5 | 100 | 83 | 17 | 0 | 100 | 0 |
| 1% Gd/2% Pd/$TiO_2$ | 79 | 2.15 | 99.8 | 96.4 | 3.6 | 0 | 100 | 0 |
| 1% Gd/2% Pd/$TiO_2$/AC | 550 | 2.25 | 100 | 88.5 | 11.5 | 0 | 100 | 0 |

It is evident from the above discussion that the addition of lanthanide elements to the palladium catalysts results in a significant improvement in the activity and stability of the catalysts. It seems that lanthanide elements, in particular gadolinium, can really scavenge oxygen, and/or enhance the electron density near Pd sites, thus improving the stability of the catalyst by raising its resistance against deactivation by oxidation of the noble metal (palladium).

Moreover, activated carbon can improve the attributes of titania supports, significantly increasing their surface area, and consequently giving a further boost to the stability of the catalyst under net oxidizing conditions. These catalysts also have a higher tolerance to other stack gases, in particular water and sulfur dioxide, as will be discussed in a separate section.

Effect of Water and $SO_2$

Figure 9:
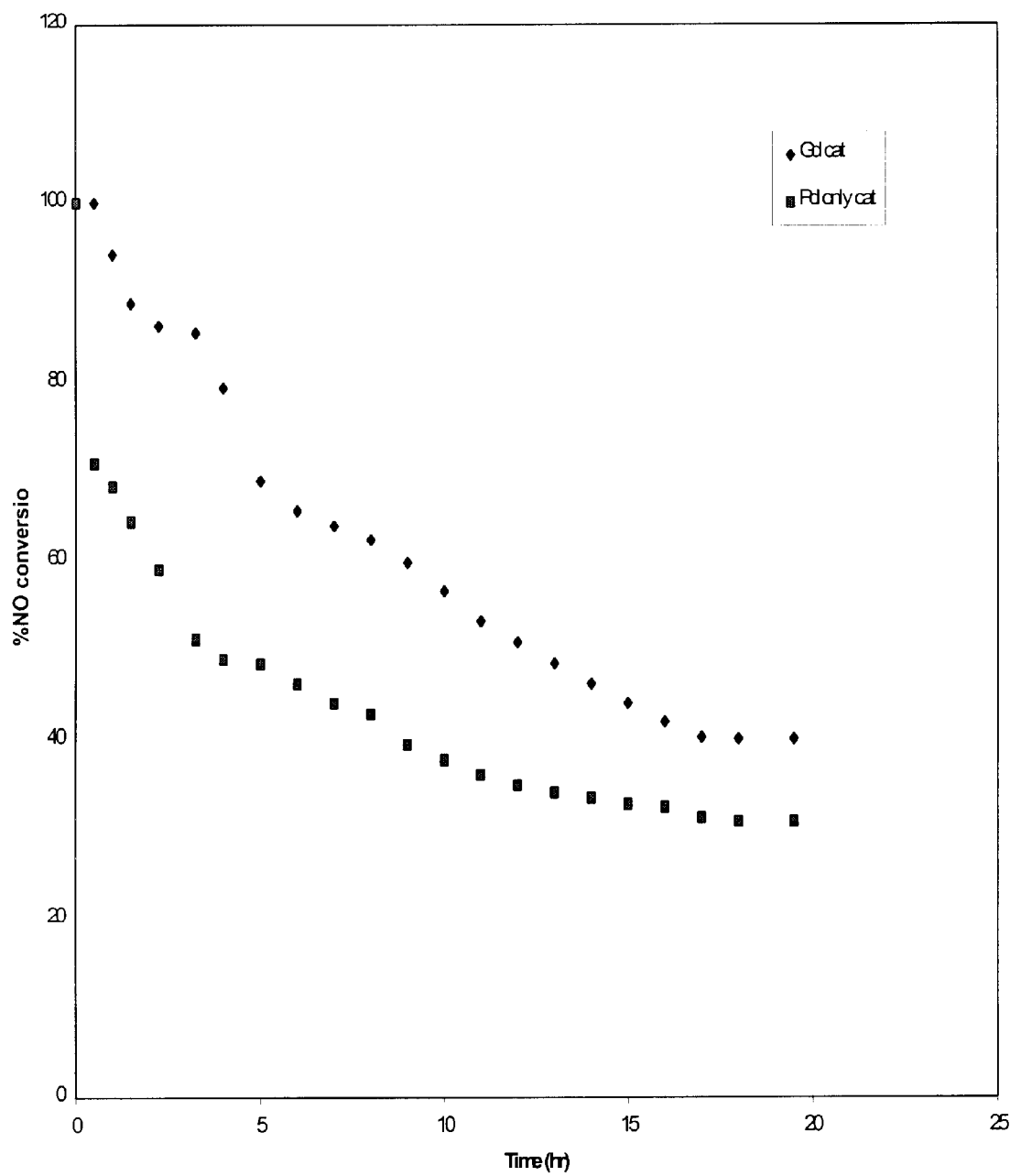
FIG. 9 is NO conversion versus $SO_2$ time graph for Pd/$TiO_2$/A.C. and Gd/Pd/$TiO_2$/A.C. catalysts, in accordance with one embodiment of the present invention.

One of the expected advantages of titania/activated carbon mixed support catalysts was to improve the resistance of the catalyst to other stack gases such as sulfur dioxide and water. Even for the 2%Pd/$TiO_2$/A.C. catalyst, there was a slight improvement with respect to the $SO_2$ resistance of the catalyst. FIG. 9 compares the variations of NO conversion on Pd/$TiO_2$/A.C. and Gd/Pd/$TiO_2$/A.C. catalysts when 145 ppm $SO_2$ are added to the reactant mixture of $O_2$, $CH_4$, NO and He.

The conditions for this reaction were 500° C., 45 $cm^3$/min (total flow rate), 1.065% methane, 500 ppm NO, 7500 ppm $O_2$, in balance gas helium. Let it be noted that the oxygen concentration was much lower than in the experiments with the gadolinium-based catalysts, where 2% $O_2$ was introduced instead. The reason for this is simply that the gadolinium catalysts have a much higher oxygen resistance, and the objective is to see if even under oxygen rich conditions the catalysts can resist further deactivating agents such as $SO_2$ and water.

The conversion of NO for the 2%Pd/$TiO_2$/A.C. after 4.5 hours is close to 50%, which shows that a slow, but not total deactivation taking place. The catalyst was kept on line for almost 19 hours, and even after that period of time a conversion of 32% NO was maintained. This represented a slight improvement with respect to the titania-only catalyst.

In the case of the 1%Gd/2%Pd/$TiO_2$/A.C. sample, there was also a significant increase in the resistance to sulfur dioxide. In fact, the NO conversion was still at 79% after 4 hours of exposing the catalyst to 145 ppm of $SO_2$. Again, a slow but steady decline in the NO conversion occurred as time elapsed, until a steady state was reached. The final conversion of NO was approximately 40%. The total time the catalyst was kept on stream was 19.5 hours.

For the water resistance experiments, the reaction conditions were the same described as before, with the exception of the oxygen concentration, which was 2.15% instead, and there was water instead of $SO_2$ in the feed.

As expected, the NO conversion was not affected by the presence of water, and even after more than 20 hours on stream, the catalyst remained active reducing the NO with nearly 100% conversion. The nitrogen selectivity, which is lower in activated carbon/titania mixed support catalyst compared with titania-only catalysts, was slightly improved after the addition of water. In the case of the 2%Pd/$TiO_2$/A.C. catalyst, the final NO conversion was over 99%, with a nitrogen selectivity of nearly 95% even after keeping the water more than 21 hours. No signs of deactivation were observed during that period of time. The water concentration in the feed was 6.6%.

In the case of the 1%Gd/2%Pd/$TiO_2$/A.C., the catalyst was kept on line for almost 30 hours and its stability was maintained at all times. The final NO conversion was still above 99% percent, with nitrogen selectivity higher than 97%. The water concentration in the feed was the same as before, 6.6%.

All these experiments prove that the incorporation of activated carbon in the titania sol-gel support have a positive effect in the resistance of the catalyst to oxygen, sulfur dioxide and water. The maximum oxygen resistance was moderately increased, whereas the stability towards sulfur dioxide poisoning was also improved. Water did not have any detrimental effect in the catalyst, just as in the case of the titania-only catalysts, and in fact it brought a positive effect decreasing the generation of ammonia in the product stream, thus increasing the nitrogen selectivity.

$NO_2$ Catalytic Reduction

Since this catalyst showed good performance towards NO reduction with methane, we decided to use the same catalyst to reduce $NO_2$ under similar reaction conditions. An important additional objective was to find evidence supporting or refuting the role of $NO_2$ as an intermediate in NO reduction with $CH_4$.

Consequently, a series of runs was carried out to find out whether or not the 1%Gd/2%Pd/$TiO_2$/A.C. and the 2%Pd/$TiO_2$/A.C. catalysts were able to reduce $NO_2$ and if so, to discover the maximum resistance to oxygen in the feed.

The reaction conditions were kept the same as in the case of NO catalytic reduction experiments, i.e., 500° C. (reaction temperature), 45 $cm^3$/min (total flow rate), 1.065% methane, 500 ppm $NO_2$, 0–2.25% $O_2$, in helium balance gas.

In the case of the 1%Gd/2%Pd/$TiO_2$/A.C. catalyst, it was interesting that some difference was found in the reduction activity towards nitrogen dioxide as compared to nitric oxide. As mentioned before, this catalyst was able to achieve 100% NO conversion even with 2.25% $O_2$ in the feed gas. However, its maximum resistance to oxygen becomes only 2% in the reduction of $NO_2$ under the same reaction conditions. This proves that $NO_2$ is a much more vigorous oxidizing agent than NO and also it might hint at the possibility that $NO_2$ is not really a reaction intermediate in the NO reduction network.

Consistent with the above observations, the maximum oxygen resistance for the 2%Pd/$TiO_2$/A.C. catalyst in the $NO_2$ catalytic reduction is also lower, 1.2%, which again suggests that nitrogen dioxide is a more vigorous oxidant than nitric oxide for oxidation of $Pd^0$ sites.

Nitrous Oxide Catalytic Reduction

Again, the same catalysts used for NO and $NO_2$ reduction (1%Gd/2%Pd/$TiO_2$/A.C. and 2%Pd/$TiO_2$/A.C.) were also used for the reduction of $N_2O$. The concentrations of the reactants were kept almost the same, 1.065% methane, 500 ppm nitrous oxide, 1.2–2.15% oxygen, in helium balance gas. The reaction conditions were also maintained constant: reaction temperature of 500° C., with a total flow rate of 45 $cm^3$/min and 69 mg of catalyst loading.

The 2%Pd/$TiO_2$/A.C. catalyst was able to yield 100% $N_2O$ conversion even if the oxygen concentration in the feed was 1.5%, without any nitric oxide, ammonia or other harmful byproducts detected in the exit stream.

In the case of the 1%Gd/2%Pd/$TiO_2$/A.C. catalyst, it was possible to achieve 100% $N_2O$ conversion to nitrogen under slightly above stoichiometric oxygen conditions (2.15% $O_2$). Moreover, unlike the NO reaction, this reaction does not produce any ammonia, thus yielding 100% selectivity to nitrogen. While more in-depth studies to assess the resistance of the catalyst to water and other stack gases might be necessary in the future for this catalyst to become applicable, the prospects look very promising. This Gd-based catalyst appears to be multi-functional, for it can successfully remove NO, $NO_2$, and $N_2O$ with methane as reducing agent, making it a very attractive option for possible practical applications.

TPD Experiments

Figure 10:
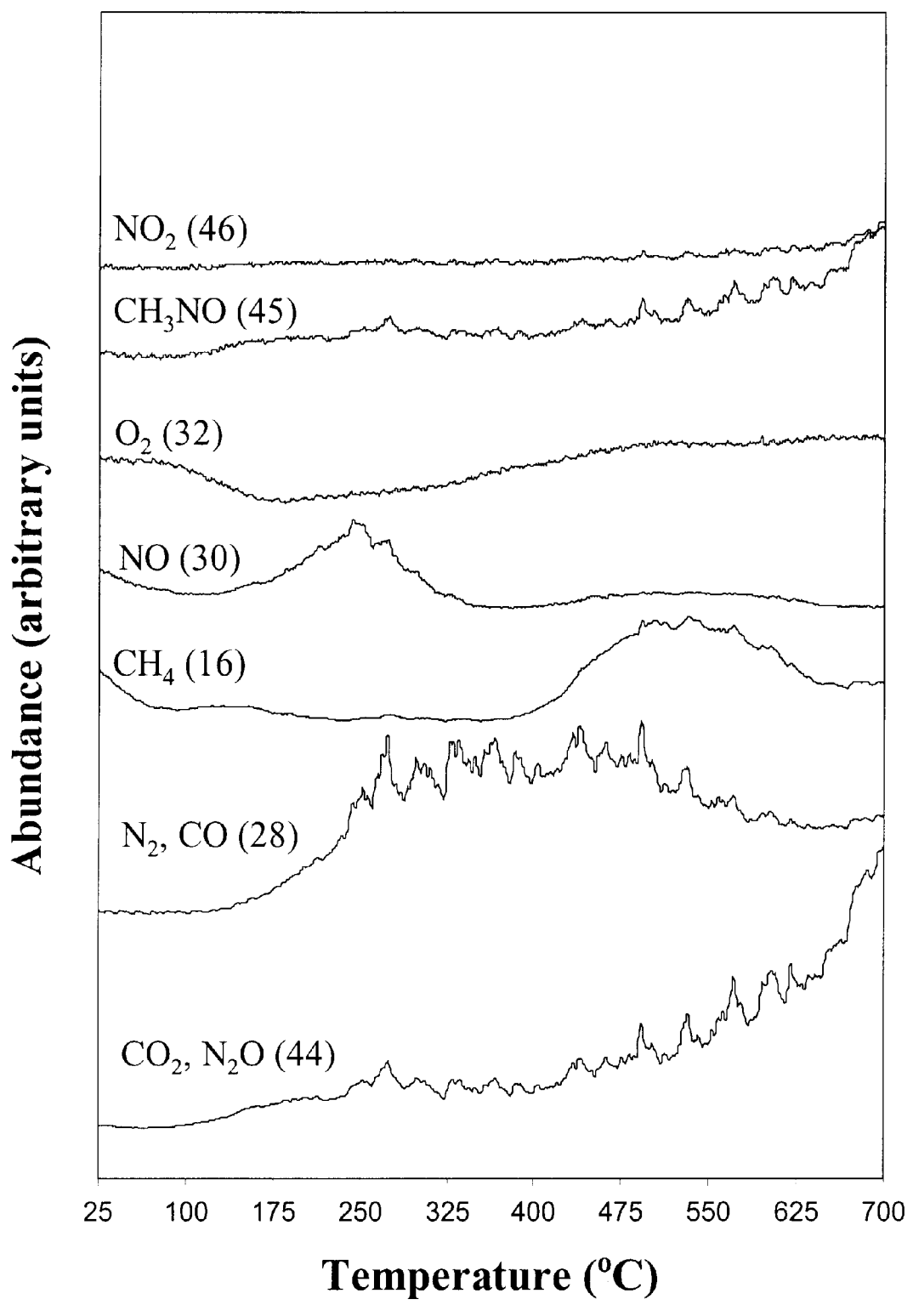
FIG. 10 is $NO+CH_4$ TPD Profile on Gd/Pd/$TiO_2$/A.C. catalyst, in accordance with one embodiment of the present invention.

FIG. 10 shows the TPD profile of simultaneous NO+$CH_4$ adsorption at room temperature for 1%Gd/2%Pd/$TiO_2$/A.C. catalyst. The most important features of this plot are the, presence of single distinct peaks for methane and nitric oxide desorption, which apparently seems to indicate that these species might adsorb on different sites, which have different energies and that is why they desorb at different temperatures. In general, NO desorption occurs before $CH_4$ desorption, around 100° C. versus 400° C. in the case of methane.

Another observation is the presence of large amounts of ion 44 coming off the surface, especially at temperatures above 550° C. While the m/e ratios of $CO_2$ and $N_2O$ are both 44, the observed peak is probably composed mostly of carbon dioxide, because the support has activated carbon in it and an increase in the area of $CO_2$ peak in gas chromatograms was observed during steady state reaction experiments.

Species 46 and 45 are observed in all cases as well, and presumably 45 could be $CH_3NO$, an intermediate which has been reported elsewhere in the literature. However, the signal is relatively low and suspiciously resembles species 44, and it might as well be associated with $CO_2$ as well.

Figure 11:
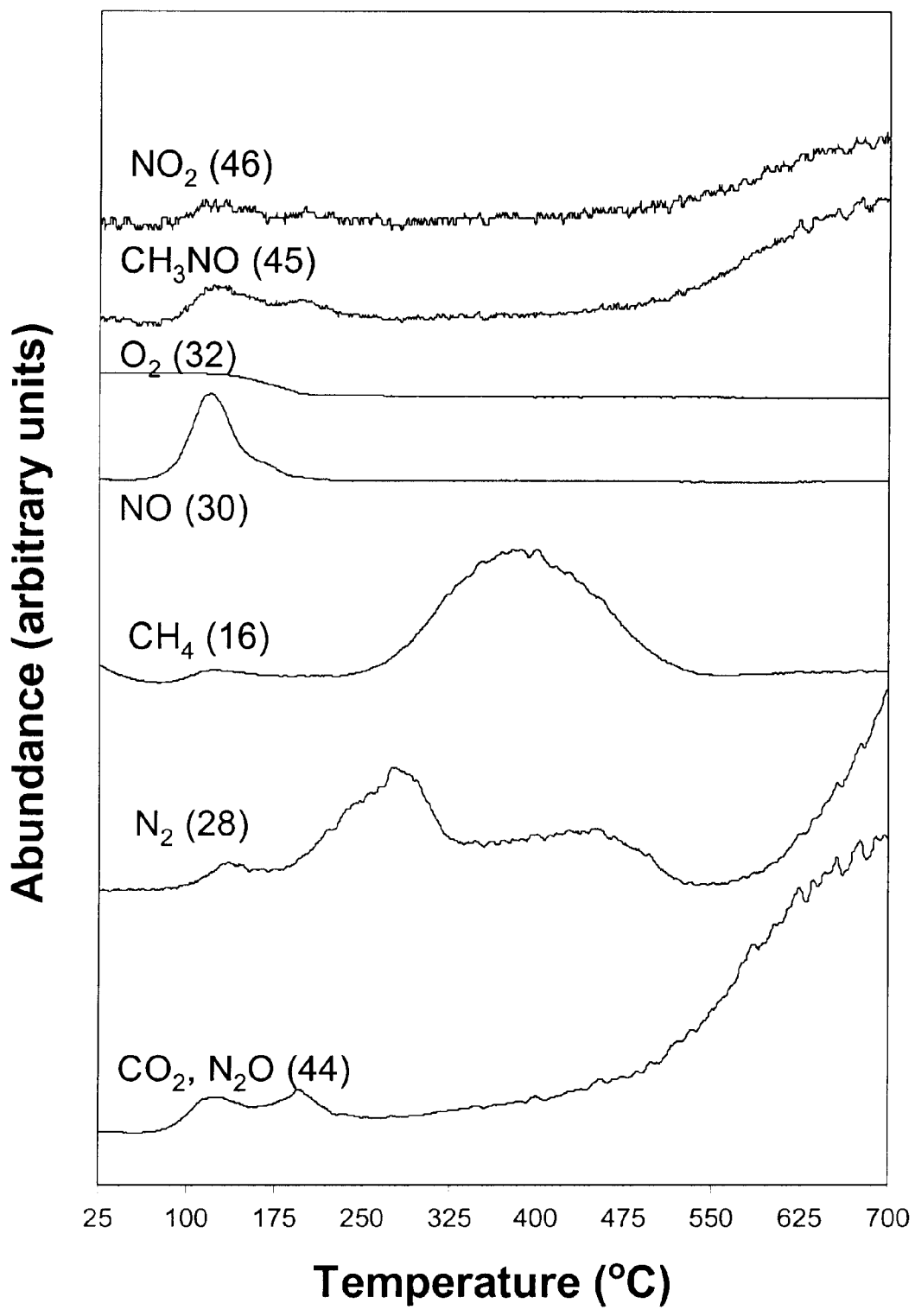
FIG. 11 is NO+CH4 TPD Profile on Pd/TiO2/A.C. catalyst, in accordance with one embodiment of the present invention.

FIG. 11 shows the TPD profile of simultaneous $NO+CH_4$ adsorption at room temperature for 2%Pd/$TiO_2$/A.C. catalyst. This plot look similar to its equivalent Gd-based catalyst profile, having methane and nitric oxide desorption at different temperatures in distinct peaks and having a very big signal from ion 44, which as in the previous case, is suspected to come mostly from carbon dioxide. As a matter of fact, the signal appears even bigger for Pd-only catalysts, and this might imply that Gd helps the catalyst to avoid the oxidation of carbon as $CO_2$. Also present are the signals for ions 45 and 46, and these signals are extremely similar to 44. While the presence of $CH_3NO$ is possible, an alternative explanation is that 45 and 46 are related to carbon dioxide as well.

Figure 12:
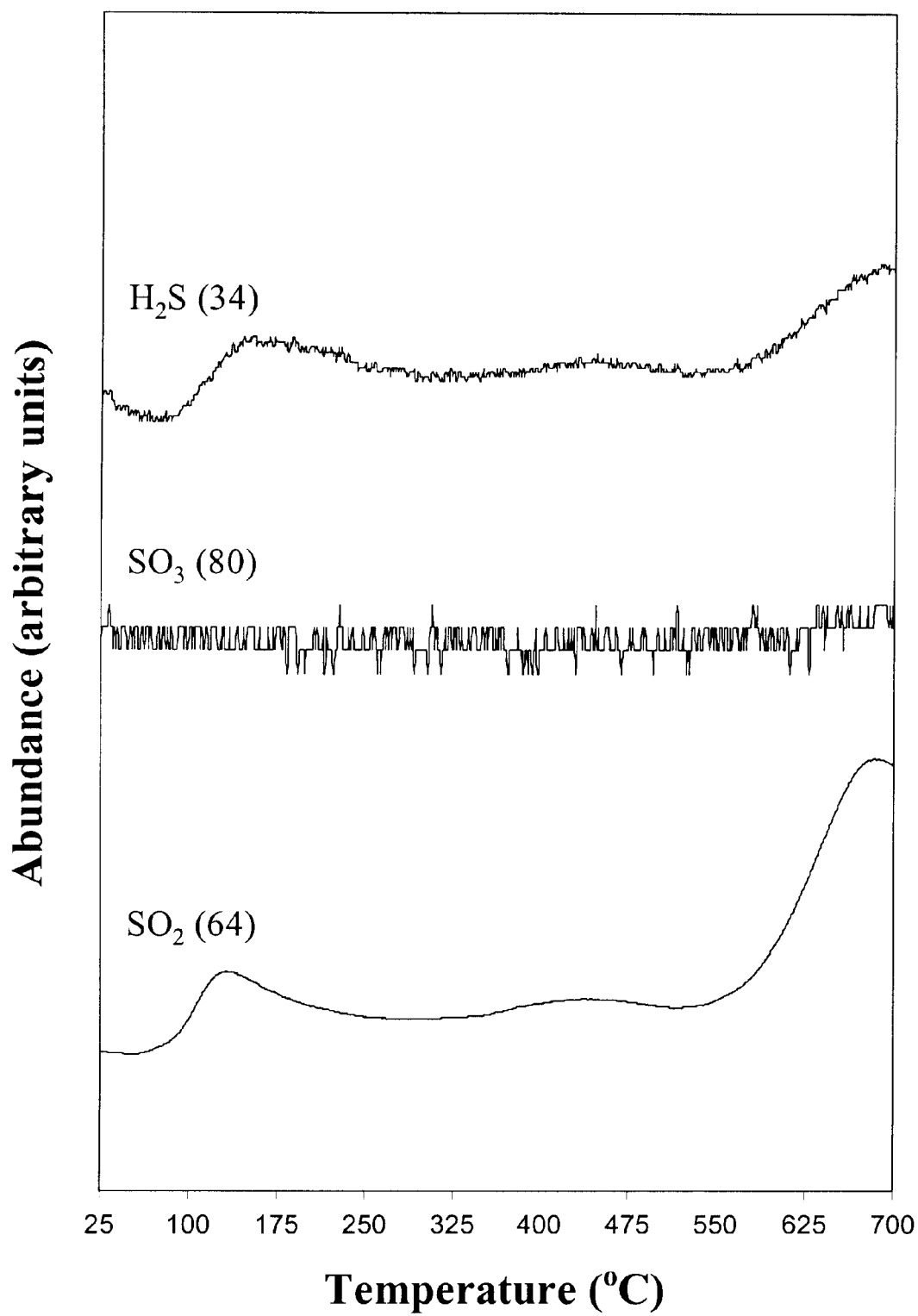
FIG. 12 is SO2 TPD Profile on 1%Gd/2%Pd/TiO2/A.C. catalyst, in accordance with one embodiment of the present invention.
Figure 13:
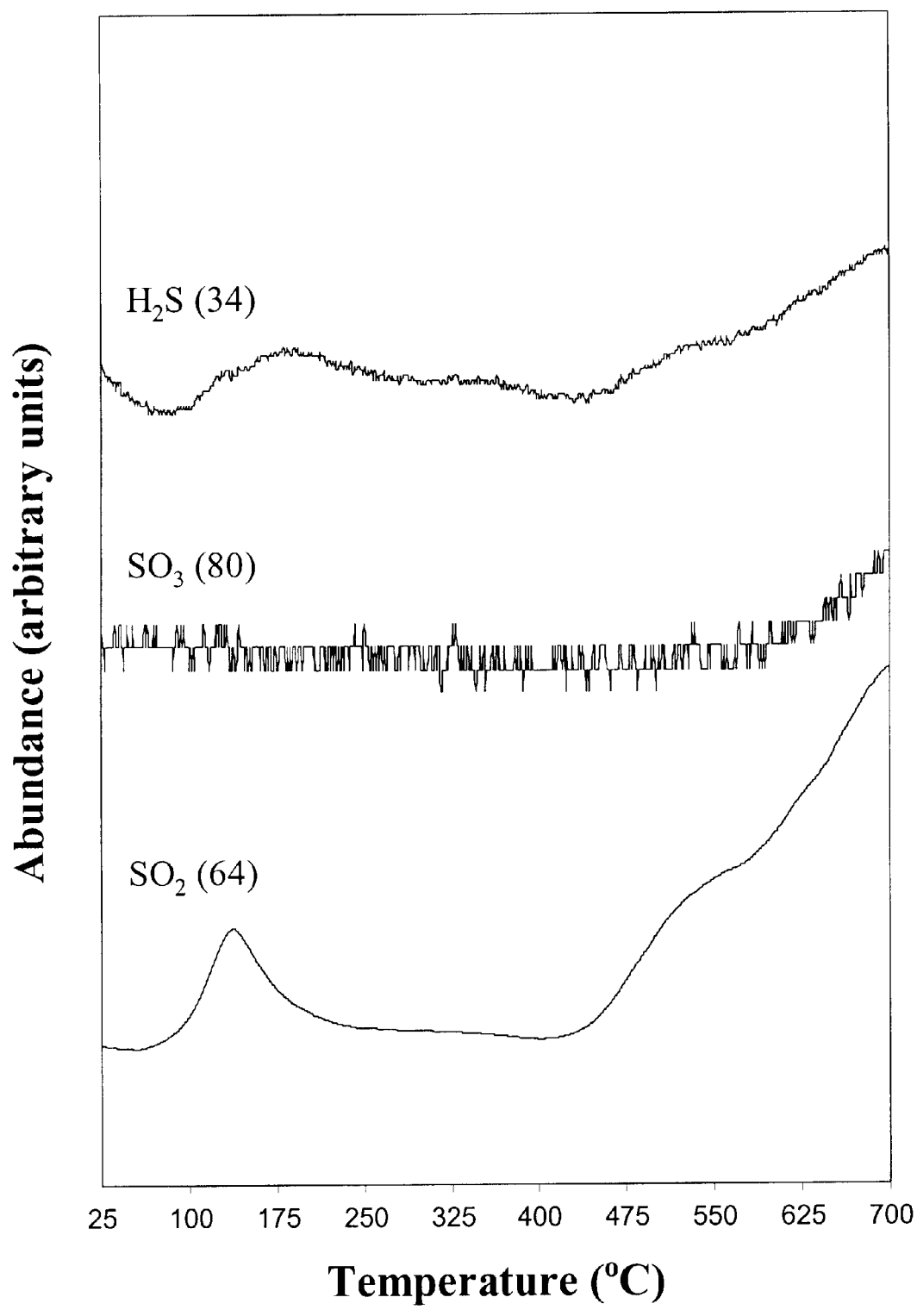
FIG. 13 is SO2 TPD Profile on 2%Pd/TiO2/A.C. catalyst, in accordance with one embodiment of the present invention.

Finally, FIGS. 12 and 13 show the $SO_2$ TPD profiles for 1%Gd/2%Pd/$TiO_2$/A.C. and 2%Pd/$TiO_2$/A.C. catalysts. The adsorption was at room temperature. The most important observation from these graphs is the distinct and clear $SO_2$ signal, peaking at relatively low temperatures (150° C.). There is a larger peak coming off at higher temperatures (close to 500° C.), and it extends all the way up to 700° C. These peaks probably suggest that the adsorption of $SO_2$ is irreversible and perhaps the activity loss caused by $SO_2$ on the catalyst could be restored somehow.

The signal corresponding to $SO_3$ is almost featureless, and we could almost say that no significant amounts of $SO_3$ or sulfates are formed when $SO_2$ interacts with the catalyst surface. Once again, the features observed in the Gd-based catalyst closely resemble those observed on the Pd-only catalyst.

Another species that consistently appears during these experiments is $H_2S$ (m/e=34). Its maximum peak appears right after the $SO_2$ peak does, and it is definitely smaller in intensity. Furthermore, there is a second gentle slope that follows the $SO_2$ signal very closely. This $H_2S$ might form from the interaction of hydrogen present in the activated carbon surface with sulfur coming from $SO_2$ in the gas phase, since it was not observed in previous studies with titania-only catalysts.

The TPD profiles in Gd—Pd and Pd-only catalysts are generally similar. It is likely that the superior performance of Gd—Pd catalysts can be explained in terms of the capacity of the gadolinium to scavenge oxygen and keep palladium in the reduced (metallic) state, rather than in terms of different reaction mechanisms.

The presence of $CH_3NO$ as an intermediate in the $CH_4$+ $NO+O_2$ reaction network cannot be definitely proved, but it should not be dismissed altogether, since ion 45 is consistently observed in all TPD experiments. Further studies to pin down this elusive ion should definitely be carried out in the future.

Conclusions

This study has shown how the catalytic reduction of NO with methane as reducing agent is possible by using a 1%Gd/2%Pd/$TiO_2$/A.C. catalyst. Comparing the 1%Gd/2%Pd/$TiO_2$ catalyst with this new 1%Gd/2%Pd/$TiO_2$/A.C. sample, the latter proved superior to the titania-only version of the formulation. It seems that activated carbon really brought an improvement to the activity and stability of the catalyst. The most obvious reason for this is the high surface area that activated carbon supports have, which is at least an order of magnitude higher than that of titania supports. The other possibility is that the presence of carbon in close proximity to Pd sites may help to keep them in a reduced state. Thus, activated carbon, when incorporated into the sol-gel titania support, shows an interesting synergistic effect, improving the stability of both Pd-only and Gd—Pd catalysts and protecting them against deactivation by oxygen and sulfur dioxide, while still keeping the excellent resistance to water. Nevertheless, activated carbon containing catalysts tend to have lower selectivity to nitrogen, thus increasing the selectivity to ammonia, possibly due to the presence of hydrogen in the activated carbon. This problem disappears when water is introduced in the feed.

Both these formulations are also active towards $NO_2$ selective catalytic reduction. Nevertheless, the maximum resistance to oxygen is lower when nitrogen dioxide is present in the feed as compared with the case of nitric oxide, the reason being that $NO_2$ is a much more vigorous oxidizing agent for the palladium metallic sites. This behavior also suggests that some reports in the literature proposing $NO_2$ as intermediate in the NO SCR network might be not applicable to this catalytic system. Nitrous oxide, a greenhouse gas whose emissions will soon have to be curtailed, can also be reduced with our Gd-based catalyst, thus giving this catalyst a high versatility and range of potential applicability in the near future.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, it will be within the ability of one of ordinary skill in the art to make alterations or modifications to the present invention, such as through the substitution of equivalent materials or structural arrangements, or through the use of equivalent process steps, so as to be able to practice the present invention without departing from its spirit as reflected in the appended claims, the text and teaching of which are hereby incorporated by reference herein. It is the intention, therefore, to limit the invention only as indicated by the scope of the claims and equivalents thereof.

What is claimed is:

1. A supported catalyst said catalyst comprising at least one active metal and at least one promoter metal attached to a support, said support comprising titanium dioxide, wherein said at least one active metal comprises a metal selected from the group consisting of palladium, platinum and mixtures thereof, and said at least one promoter metal comprises a metal selected from the group consisting of lanthanide metals, and mixtures thereof, wherein said support comprises activated carbon and wherein the ratio of said titanium dioxide to said activated carbon is about 3:1.

2. A supported catalyst according to claim 1 wherein said at least one promoter metal is selected from the group consisting of cerium, lanthanum, ytterbium, gadolinium, and mixtures thereof.

3. A supported catalyst according to claim 1 wherein said at least one promoter metal is added to the catalyst in amounts of from about 0.1% to about 20% by weight.

4. A supported catalyst according to claim 1 wherein said promoter metal comprises gadolinium and is present in a weight percent range of 0.1% to 20% and said active metal comprises palladium and is present in a weight percent range of 0.1% to 30%.

5. A supported catalyst according to claim 4 wherein the ratio of said palladium to said gadolinium is about 2:1.

6. A supported catalyst according to claim 1 wherein said at least one promoter metal and said at least one active metal are attached to said support by a process selected from the group consisting of wet impregnation and modified sol-gel.

7. A method of reducing nitrogen oxides with at least one lower hydrocarbon using a catalyst, said method comprising the steps:
  (a) obtaining a supported catalyst, said catalyst comprising at least one active metal and at least one promoter metal attached to a support, said support comprising activated carbon, wherein said at least one active metal comprises palladium, said support arising from the polymerization of at least one precursor thereof, said at least one active metal and said at least one promoter metal having been attached to said support by said at least one promoter metal having been co-precipitated with said precursor of said support, wherein the ratio of said palladium to said promoter metal is about 2:1; and
  (b) bringing nitrogen oxides and lower hydrocarbons into contact with said catalyst for sufficient time and at sufficient temperature so as to allow nitrogen oxide to be reduced.

8. A method according to claim 7 wherein said lower hydrocarbon is selected from the group consisting of lower alkanes, lower alkenes and lower alkynes.

9. A method according to claim 7 wherein said lower hydrocarbon is selected from the group consisting of methane, ethane, propane, ethylene and propylene.

10. A method according to claim 7 wherein said support comprises titanium dioxide.

11. A method according to claim 10 wherein the ratio of titanium dioxide to activated carbon is about 3:1.

12. A method of reducing nitrogen oxides with methane using a catalyst, said method comprising the steps:
  (a) obtaining catalyst for the reduction of nitrogen oxides, said catalyst comprising:
    (i) at least one promoter metal comprises gadolinium and is present in a weight percent range of 0.1% to 20%;
    (ii) at least one active metal, wherein said active metal comprises palladium and is present in a weight percent range of 0.1% to 30%; and
    (iii) a catalyst support, wherein said support comprises titanium dioxide; and
  (b) bringing nitrogen oxides and methane into contact with said catalyst for sufficient time and at sufficient temperature so as to allow nitric oxide to be reduced.

13. A method according to claim 12 wherein the ratio of said palladium to said gadolinium is about 2:1.

14. A method according to claim 12 wherein said support further comprises activated carbon.

15. A method according to claim 14 wherein the ratio of titanium dioxide to activated carbon is about 3:1.

16. A method of reducing nitrogen oxides present in a stream of gas comprising nitrogen oxides with at least one lower hydrocarbon using a catalyst, wherein said stream of gas is substantially devoid of carbon monoxide and hydrogen gas said method comprising the steps of:
  (a) obtaining a supported catalyst, said catalyst comprising at least one active metal and at least one promoter metal attached to a support, wherein said at least one active metal comprises palladium, said support arising from the polymerization of at least one precursor thereof, said at least one active metal and said at least one promoter metal having been attached to said support by said at least one promoter metal having been co-precipitated with said precursor of said support; and
  (b) bringing said stream of gas comprising said nitrogen oxides and said lower hydrocarbons into contact with said catalyst for sufficient time and at sufficient temperature so as to allow nitrogen oxide to be reduced.

* * * * *